US008290821B2

(12) United States Patent
Kwon

(10) Patent No.: US 8,290,821 B2
(45) Date of Patent: Oct. 16, 2012

(54) SERVICE METHOD AND APPARATUS FOR PROVIDING ONLINE INTEGRATED SHOPPING MALL

(76) Inventor: Yeong-Chun Kwon, Daegu (KR)

( * ) Notice: Subject to any disclaimer, the term of this patent is extended or adjusted under 35 U.S.C. 154(b) by 344 days.

(21) Appl. No.: 12/593,850

(22) PCT Filed: May 8, 2007

(86) PCT No.: PCT/KR2007/002258
§ 371 (c)(1),
(2), (4) Date: Sep. 29, 2009

(87) PCT Pub. No.: WO2008/120836
PCT Pub. Date: Oct. 9, 2008

(65) Prior Publication Data
US 2010/0100458 A1  Apr. 22, 2010

(30) Foreign Application Priority Data
Mar. 30, 2007 (KR) .................. 10-2007-0031537

(51) Int. Cl.
G06Q 30/00 (2006.01)
(52) U.S. Cl. ...................................... 705/26.1
(58) Field of Classification Search .............. 705/26.1
See application file for complete search history.

(56) References Cited

U.S. PATENT DOCUMENTS

| 6,199,099 | B1 | 3/2001 | Gershman et al. |
| 6,556,975 | B1* | 4/2003 | Wittsche ............... 705/14.73 |
| 2002/0072974 | A1* | 6/2002 | Pugliese et al. ......... 705/14 |
| 2003/0120560 | A1* | 6/2003 | Almeida ................ 705/27 |
| 2003/0225630 | A1* | 12/2003 | Kakuta ................. 705/26 |
| 2003/0236712 | A1 | 12/2003 | Antonucci et al. |
| 2006/0129426 | A1* | 6/2006 | Pearson ................. 705/2 |
| 2007/0244756 | A1* | 10/2007 | Stucki ................... 705/14 |
| 2008/0208710 | A1* | 8/2008 | Taguchi et al. ......... 705/27 |

FOREIGN PATENT DOCUMENTS

| KR | 1020010096625 A | 11/2001 |
| KR | 1020020030836 A | 4/2002 |

OTHER PUBLICATIONS

Unknown author, "Yub.com Goes Virtual; Created 3D Shopping Experience; Mall Simulates Real-Life Mall Visit; Includes Kiosks, Storefronts, and is Multi-Level," Business Wire, New York, Jun. 1, 2005, p. 1.*

PCT International Search Report of Int'l Application No. PCT/KR2007/002258 filed on May 8, 2007.

* cited by examiner

*Primary Examiner* — Amee A Shah
(74) *Attorney, Agent, or Firm* — Kile Park Goekjian Reed & McManus PLLC

(57) ABSTRACT

An online integrated shopping mall service system registers manufacturing/enterprises, SOHO distribution enterprises, and SOHO trade enterprises as enterprise members, provides the shopping mall with commodities, sells the commodities, and manages the sales record of the commodities. If a member is a shopping-mall founder, a sideline-person, a SOHO distribution enterprise, or a SOHO trade enterprise, the system assigns a free retail-client shopping mall to the member, such that the member sells commodities at retail in the client shopping mall, performs the shopping mall management, registers commodities as regular commodities to be sold in the client shopping mall, and assigns lower client shopping malls to others. The system assigns a specific administrator who satisfies a predetermined condition to a wholesale-qualified member capable of managing the wholesale shopping mall, assigns the wholesale shopping mall to the qualified member, and sells the commodities at wholesale.

13 Claims, 20 Drawing Sheets

INITIAL-VISITOR RECORDING DB

제품명/용량 » 엔진세정제(디젤,가솔린,LPG)차량 공용/375ml
(Article name/
Content)
판매가격 » 20,000원
(The selling
Price)

(주)인피니스

제품명/용량 » 연료시스템 세정제(가솔린 차량용)/375ml
(Article name/
Content)
판매가격 » 20,000원
(The selling
Price)

(주)국지엠

제품명/용량 » 삼계탕 인삼 + 닭한마리/1,000g
(Article name/
Content)
판매가격 » 7,000원
(The selling
Price)

▶ E-BROKER
EXPORT / IMPORT / ORDER RECEIPT AND
DELIVERY PROCESSING METHOD

Direct Purchase Order

INFINITES CO., LTD.
202, 570-2 YONGSAN-DONG, DALSEO-GU, DAEGU, KOREA
Tel : 82-53-583-3482 Fax : 82-53-583-3483
E-Mail : yongjinkim@korea.com Homepage : www.infinit.co.kr

Purchase Order

Date: 2006-12-26

| 주소입력창 | |
| 현금주소 입력창 | |
| ☐ 한국어 | [ ] - [ ]  우편번호찾기 |

| Buyer Name | |
| address | |
| contury | |

Gentleman :
Please kindly supply the following goods under the terms and conditions as below :

| 이미지 | Item | Origin | Unit Price | Quantity | Total Amount |
|---|---|---|---|---|---|
|  | dsc | korea | $77 | 100 | $7700 |
|  | ef | korea | $80 | 200 | $16000 |

| Shopping Port | |
| Destination | |
| Shopping / Expiry Date | partial shipments are prohibited. |
| Payment Terms | |

Document required are

Signed commercial invoice in triplicate
Packing 1st in triplicate
Full set of clean on board bills of lading
Insurance : Marine insurance policy or certificate in
duplicate endorsed in blank for 100% of the invoice
value covering I.C.C.(A). institute war clauses Yours truly,
INFINITES CO.,LTD.
Y.J. Kim / President

[신청완료] [취소]

SERVICE METHOD AND APPARATUS FOR PROVIDING ONLINE INTEGRATED SHOPPING MALL

TECHNICAL FIELD

The present invention relates to an online shopping mall, and more particularly to a method and apparatus for providing an online integrated shopping mall in which an online advertisement field and a business field are integrated with each other, and a B2B (Business-to-Business), a B2C (Business-to-Consumer), and a C2C (Consumer-to-Consumer) are also integrated with each other.

BACKGROUND ART

Generally, small and medium-sized enterprises engaged in manufacturing/export/distribution businesses must consume a large amount of money to construct their national business networks, such that most small and medium-sized enterprises have supplied wholesale dealers, commission agents, and sales corporations with their commodities not directly distributing their commodities to consumers.

Also, although some enterprises have quality products, they have difficulty in selling their commodities to consumers due to insufficient advertisement of the commodities.

Presently, most personal enterprises engaged in manufacturing or distribution fields are small business enterprises. Indeed, it is impossible for them to construct a national business network and/or a regional business network. Although they construct online SOHO shopping mall sites, and desire to sell their commodities to consumers using the online SOHO shopping mall sites, they must consume a large amount of money to construct their shopping mall sites, and have difficulty in conducting a photo-image manufacturing process, commodity-registration management process, and settlement management process. Provided that the number of business items or products is low, the number of consumers' visits may also be low.

In the meantime, according to advertisement types of conventional online shopping malls, the online shopping mall sites generally pay associated-portal sites for advertising costs to have banner advertisement messages displayed on Web-pages of the associated-portal sites so that visitors or quests of the Web-pages can view the banner advertisement messages.

Also, advertisers pay advertisement costs to advertisement-agent Web-sites to have their advertisement banners registered in the advertisement-agent Web-sites, and members registered in the advertisement-agent Web-sites expose the advertisement banners to unspecified people via other Web-sites.

However, the above-mentioned conventional online shopping mall advertisement methods must spend a lot of money as advertisement costs, so that business incomes acquired from the online shopping malls may be unavoidably decreased. Indeed, most online shopping mall companies are earning a small amount of money due to the advertisement costs.

DISCLOSURE

Technical Problem

Therefore, the present invention has been made in view of the above problems, and it is an object of the present invention to provide a method and apparatus for providing an online integrated shopping mall in which an online advertisement field and a business field are integrated with each other, and a B2B (Business-to-Business), a B2C (Business-to-Consumer), and a C2C (Consumer-to-Consumer) are also integrated with each other.

It is another object of the present invention to provide a method and apparatus for providing an online integrated shopping mall in which all of transactions or sales can be carried out at only one place, distribution margins (or business margins) can be reduced, and consumers can purchase desired commodities at rational and low costs.

Technical Solution

In accordance with the present invention, the above and other objects can be accomplished by the provision of a method for providing an online integrated shopping mall in an integrated shopping mall service apparatus connected to computer terminals over the Internet, comprising: upon receiving a control signal from a shopping mall management server including a product-provider shopping mall manager, a retail shopping mall manager, and a wholesale shopping mall manager, managing a product-provider shopping mall manager by the product-provider shopping mall manager, managing a retail shopping mall by the retail shopping mall manager, managing a wholesale shopping mall by the wholesale shopping mall manager, in which the product-provider shopping mall, the retail shopping mall, and the wholesale shopping mall are managed by a plurality of sub-domains linked to a main domain of the integrated shopping mall; providing an enterprise member with an independent management page via a main homepage of the main domain, such that the enterprise member is able to simultaneously manage commodities supplied to the integrated shopping mall via the main homepage of the main domain; receiving a shopping-mall sale-in-lots request from a general member via the main homepage of the main domain, registering the general member as a regular member, assigning a client shopping mall acting as a retail shopping mall to the regular member free of charge such that the client shopping mall is managed as a sub-domain, and providing the regular member with a homepage of the client shopping mall and a client shopping mall administrator page; assigning a wholesale shopping mall to a wholesale-qualified member selected from regular members as a sub-domain such that the wholesale-qualified member can manage the wholesale shopping mall as the sub-domain, and providing the wholesale-qualified member with a homepage and administrator page of the wholesale shopping mall; and if a regular member and an enterprise member requests to register his or her commodities as regular commodities to be sold in the shopping mall, displaying information of the commodities on a main homepage, homepages of the client shopping malls, and each client shopping mall's homepage according to a predetermined product-registration request method, and managing the information of the commodities.

In accordance with another aspect of the present invention, there is provided an online integrated shopping mall service apparatus connected to computer terminals over the Internet, in which a B2B (Business-to-Business) transaction, a B2C (Business-to-Consumer) transaction, and a B2B2C (Business-to-Business-to-Consumer) transaction are integrated and conducted at one place, comprising: a main server for controlling operations of individual components of the online integrated shopping mall service apparatus; a shopping-mall management server which includes a product-provider shopping mall manager, a retail shopping mall manager, and a wholesale shopping mall manager, receives a control signal from the main server, manages a product-provider shopping mall manager via the product-provider shopping mall manager, manages a retail shopping mall via the retail shopping mall manager, managing a wholesale shopping mall via the wholesale shopping mall manager, in which the product-provider shopping mall, the retail shopping mall, and the wholesale shopping mall are managed by a plurality of sub-domains dependent-linked to a main domain of the integrated shopping mall; a database (DB) unit which includes a member database (DB), a commodity DB, an advertisement DB, an information-registration DB, and a settlement-management DB, and stores a variety of information associated with services of the online integrated shopping mall; a database (DB) server for managing the individual DBs contained in the DB unit upon receiving a control signal from the main server; a sale-in-lots management unit for receiving a shopping-mall sale-in-lots request from a general member via a main homepage of the main domain, registering the general member as a regular member in the member DB, and assigning a retail client shopping mall to the regular member free of charge via the retail shopping mall of the shopping mall management server, such that the retail client shopping mall is managed as a sub-domain; and a commodity-entry and commodity-management server connected with the commodity DB of the DB unit and the shopping mall management server, if any one of the regular member acting as the client shopping mall administrator and the enterprise member acting as the product-provider shopping mall manager administrator requests to register his or her commodities as regular commodities to be sold in the integrated shopping mall, exposing/displaying information of the commodities on any one of the main homepage, the homepages of the client shopping malls, and each client shopping mall's homepage according to a predetermined product-registration request method using the commodity DB and the shopping mall management server, and managing the information of the commodities using the commodity DB and the shopping mall management server.

Advantageous Effects

The online integrated shopping mall service apparatus and method integrates a variety of transactions of the online integrated shopping mall, for example, ensuring of commodities, commodity registration, wholesale- and retail-sales of commodities, and commodity information/advertisement, etc. Therefore, consumer, manufacturers, distribution enterprises, and wholesale/retail enterprises need not visit several places or markets to collect information of necessary commodities, and don't have to employ trade-agents. The integrated shopping mall site according to the present invention is similar to the Web 2.0 concept indicating the user-participation-based Internet environment concept, such that participation, sharing, and opening concepts are emphasized in the integrated shopping mall site.

DESCRIPTION OF DRAWINGS

The above and other objects, features and other advantages of the present invention will be more clearly understood from the following detailed description taken in conjunction with the accompanying drawings, in which:

FIG. 9 is an exemplary main-page of an online integrated shopping mall according to a preferred embodiment of the present invention;

FIG. 13 is an exemplary sub-page displayed by clicking a button corresponding to a profit settlement function shown in FIG. 10 according to the present invention;

FIGS. 18~19 are exemplary screen images associated with an administrator page of a wholesale shopping mall according to the present invention;

FIG. 20 is an exemplary screen image associated with an intermediary trade service according to the present invention; and

BEST MODE

Figure 1:
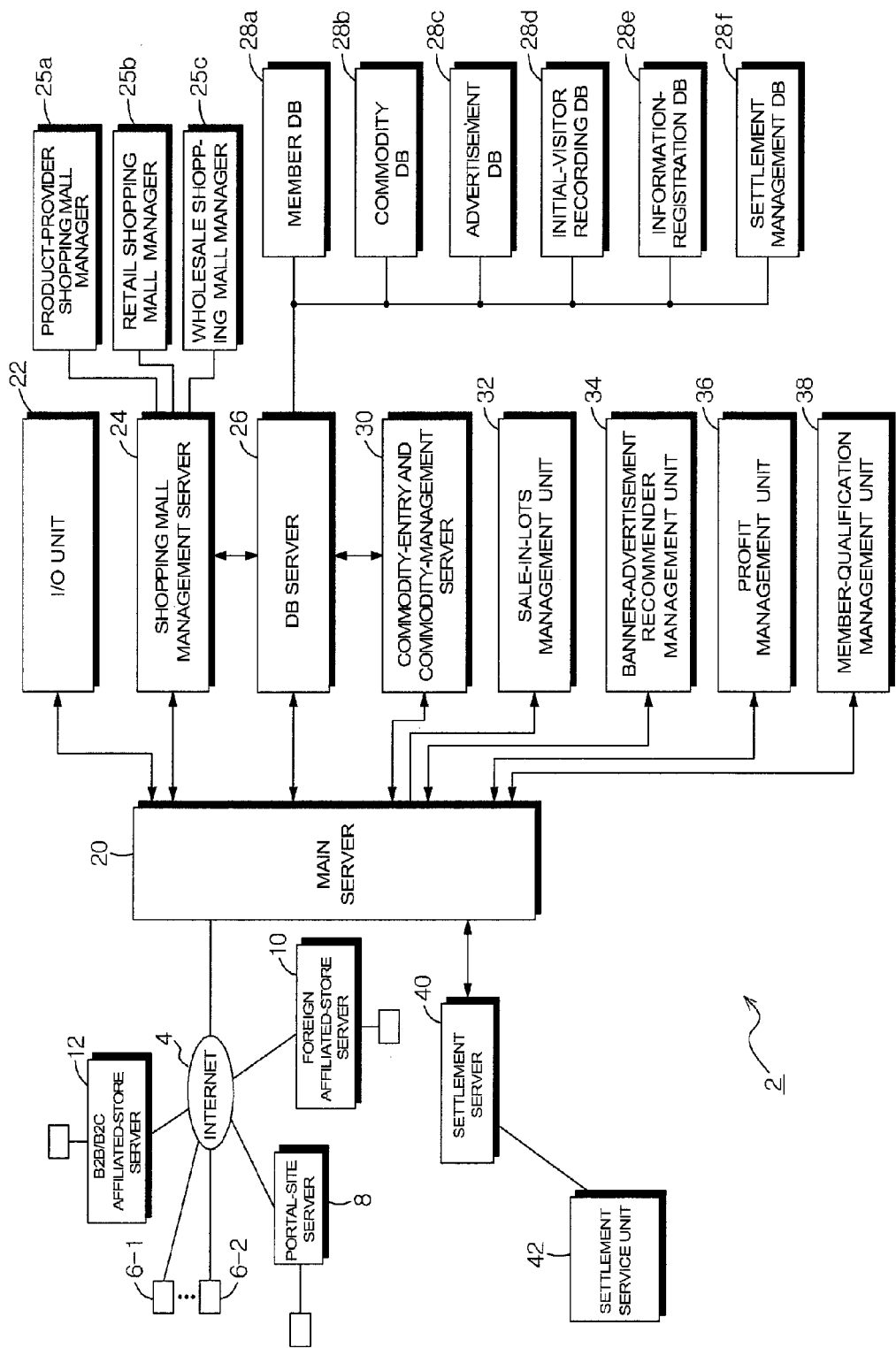
FIG. 1 is a block diagram illustrating an online Internet shopping mall service apparatus according to a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Prior to describing the present invention, it should be noted that the present invention relates to an integrated shopping mall site for conducting commodity-transaction in an online mode. In more detail, the integrated shopping mall site is similar to the Web 2.0 concept indicating the user-participation-based Internet environment concept, such that participation, sharing, and opening concepts are emphasized in the integrated shopping mall site.

A variety of users may easily gain access to the above-mentioned integrated shopping mall site, for example, housewives who need sidelines, insurance salespersons who need sales-promotion, SOHO shopping mall founders, independent enterprises (i.e., self-employed enterprises), office workers who desire to have a second job, and small and medium-sized enterprises, SOHO distribution enterprises, and SOHO trade enterprises (e.g., importer traders), etc.

The present invention can register products of the head office, products of affiliated shopping malls, and products owned by the online integrated shopping mall as sale-commodities in the online shopping mall site. In this way, the above-mentioned integrated shopping mall system has an open-type configuration.

The present invention allows users who are administrators of client shopping malls acquired from the integrated shopping mall to register their commodities or products in other client shopping malls other than their own shopping malls, and allows enterprise-advertisement banner messages to be displayed on the client shopping malls by the users, such that information of their commodity or products can be exposed to other users without payment. In this way, a plurality of users can easily share their commodity information with each other according to the present invention.

FIG. 1 is a block diagram illustrating an online Internet shopping mall service apparatus according to a preferred embodiment of the present invention.

Referring to FIG. 1, the online integrated shopping mall service apparatus 2 is connected to user terminals 6-1 and 6-2 handled by B2C/C2C members or consumers over the Internet.

The online integrated shopping mall service apparatus 2 is connected to a portal-site server 8 or foreign affiliated-store server 10 capable of providing users with general portal services over the Internet 4.

The online Internet shopping mall service apparatus 2 may also be connected to the B2B/B2C affiliated-store server 12 affiliated with manufacturing companies and/or distributors.

A terminal connected to either the portal-site server 8 or the B2B/B2C affiliated server 12 may be used as an internal administrator server, or may also be used as a B2B member's terminal connected to the Intra-network or Internet 4.

The online integrated shopping mall service apparatus 2 includes a main server 20. The main server 20 controls individual parts shown in FIG. 1, such that B2B-, B2C-, and B2B2C-transactions are conducted at only one place.

For example, the main server 20 controls the individual parts so that shopping mall founders, subsidiary workers, personal-store owners, SOHO distribution enterprises, SOHO trade enterprises (e.g., importer traders), and manufacturers, etc., can easily use the online integrated shopping mall service apparatus 2.

A user may be a manufacturing enterprise, a product intermediary-distribution enterprise, a SOHO distribution enterprise, or a SOHO trade enterprise (e.g., an importer trader), and the main server 20 according to the present invention registers the above-mentioned enterprises as enterprise members (i.e., affiliated-enterprise member or general-enterprise member).

For example, the affiliated-enterprise member (i.e., a B2B member) may be a manufacturing company, distribution company, and association, each of which has a sales team. The general-enterprise member may be a general company and association which desire to provide the online integrated shopping mall with commodities.

The main server 20 provides users with the commodities owned by the enterprise members (i.e., affiliated-enterprise members or general-enterprise members), manages the commodity sales, and provides an independent homepage linked to the main homepage, thereby managing the product advertisement.

If a member registered in the online integrated shopping mall is any one of a shopping mall founder, a subsidiary worker, a personal-store owner, a SOHO distribution enterprise, and a SOHO trade enterprise (e.g., an importer trader), the main server 20 qualifies the member to receive a client shopping mall configured in the form of a retail shopping mall.

If the member receives the client shopping mall acting as the retail shopping mall, the main server 20 sells commodities of the member at retail, advertises the commodities, and manages the client shopping mall. The client shopping mall sells a variety of commodities to unspecified people, and allows the administrator of the client shopping mall to enter his or her commodities. The administrator can sell the commodities to unspecified people via the client shopping mall. The main server 20 allows the administrator of the client shopping mall configured in the form of a retail shopping mall to sell sub-client shopping malls (i.e., lower-level shopping malls).

The main server 20 qualifies a specific administrator (who satisfies given requisites) among the administrators of the client shopping malls as an administrator of a wholesale shopping mall. The main server 20 assigns the wholesale shopping mall to an administrator who requests the wholesale shopping mall. The main server 2 helps the administrator to sell commodities to unspecified people at wholesale using the assigned wholesale shopping mall, and to advertise the commodities using the assigned wholesale shopping mall. The administrator of the wholesale shopping mall is not allowed to sell sub-wholesale shopping malls (i.e., lower-level wholesale shopping malls).

Referring to FIG. 1, an input/output (I/O) unit 22 is controlled by the main server 20, and serves as an I/O interface for a main administrator of the system.

A shopping mall management server 24 includes a product-provider shopping mall manager 25a, a wholesale shopping mall manager 25b, and a retail shopping mall manager 25c. Upon receiving a control signal from the main server 20, the shopping mall management server 24 manages the product-provider shopping malls using the product-provider shopping mall manager 25a, manages retail shopping malls using wholesale-mall management unit 25c, and manages wholesale shopping malls using the retail-mall manager 25b.

The shopping mall management server 24 divides a domain of the online integrated shopping mall into a main-domain and a sub-domain, and operates/manages the main-domain and the sub-domain. For example, the address of the main-domain may be http://aaa.co.kr. The Web-page of the main-domain is managed by a main administrator of the system and is used as a main homepage of the integrated shopping mall. An exemplary image of the main homepage of the integrated shopping mall is shown in FIG. 9.

The sub-domain is linked to the main-domain, and is divided into a plurality of sub-domains by the shopping mall management server 24, and the sub-domains are controlled by the shopping mall management server 24.

The sub-domain address may be implemented in the form of a first type "http://ID.aaa.co.kr" or a second type "http://aaa.co.kr/ID". In more detail, according to the first type, an ID code of a member who desires to receive a shopping mall is located as a sub-domain name before the main domain name "aaa.co.kr". According to the second type, the ID code is located after the sub-domain name. The homepage of each sub-domain is used as a homepage of a client shopping mall of a corresponding administrator.

If a sub-domain is implemented via the product-provider shopping mall manager 25a, the sub-domain may be the homepage of an enterprise-member of the product-provider shopping mall. The above-mentioned homepage includes an independent management page given to an enterprise-member administrator and a commodity-management page for managing several commodities supplied to the integrated shopping mall. The independent management page and the commodity-management page are used as sub-pages of the independent homepage.

If a sub-domain is implemented by the retail shopping mall manager 25b, the sub-domain is divided into as many sub-domains as the number of retail shopping mall sale-in-lots requests, and the sub-domains are managed in a homepage of the client shopping mall managed by a client administrator of the client shopping mall.

If a sub-domain is implemented by the wholesale shopping mall manager 25c, the sub-domain is divided into as many sub-domains as the number of wholesale shopping mall sale-in-lots requests, and the sub-domains are managed in a homepage of the wholesale shopping mall managed by a wholesale shopping mall member.

General members cannot gain access to the wholesale shopping mall homepage. A wholesale shopping mall sample site is open to regular members who have received the client shopping malls. If necessary, qualified regular members may receive the wholesale shopping malls.

As can be seen from FIG. 1, upon receiving a control signal from the main server 20, a database (DB) server 26 manages a member DB 28a, a commodity DB 28b, an advertisement DB 28c, an initial-visitor recording DB 28d, an information registration DB 28e, and a settlement management DB 28f, etc.

Figure 2:
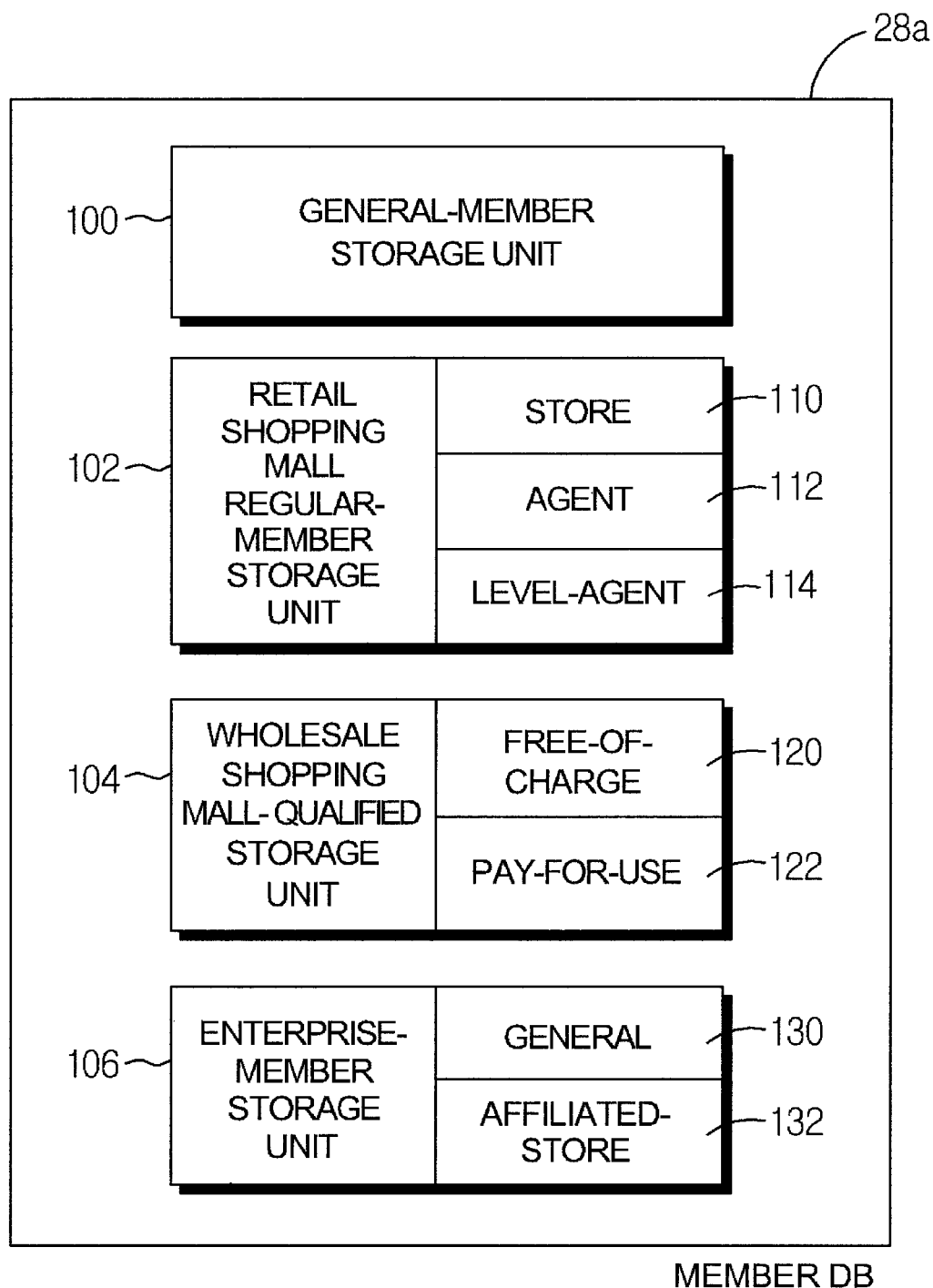
FIG. 2 is a detailed block diagram illustrating a member database (DB) shown in FIG. 1 according to the present invention.

FIG. 2 is a detailed block diagram illustrating the member DB 28a shown in FIG. 1 according to the present invention.

Referring to FIG. 2, the member DB 28a includes a general-member storage unit 100, a retail shopping mall regular-member storage unit 102, a wholesale shopping mall-qualified member storage unit 104, and an enterprise-member storage unit 106.

The general-member storage unit 100 stores information of general members. The retail shopping mall regular-member storage unit 102 stores information of regular-members of the retail shopping malls. The wholesale shopping mall-qualified member storage unit 104 stores information of wholesale shopping mall-qualified members. The enterprise-member storage unit 106 stores information of enterprise-members who provide users with products or commodities.

For example, if a user (i.e., a native and a foreigner) gains access to the main homepage of the integrated shopping mall service apparatus 2 using the computer terminal 6-1, and desires to register as a free-of-charge member in the main server 20, the main server 20 registers the user as a general member in the general-member storage unit 100 of the member DB 28a using the DB server 26. In this case, regular general member is included in a group of customers who go shopping in the online integrated shopping mall, and may receive price benefits given to general members.

A general member may request the client shopping mall from the main server 20. If the general member transmits a request of the client shopping mall to the main server 20, the main server 20 registers the general member as a regular member in the retail shopping mall regular-member storage unit 102 of the member DB 28a using the DB server 26. Therefore, the general member may be an administrator who receives the retail client shopping mall.

The client shopping mall administrator may sell a variety of commodities and his or her own commodities to unspecified people in the client shopping mall, and may register each of the commodities in the client shopping mall, such that the administrator may sell the registered commodities to people. Also, the regular-member administrator may sell sub-client shopping malls.

Regular-member information of the client shopping malls stored in the retail shopping mall regular-member storage unit 102 is classified into a store member 110, an agent member 112, and a level-agent member 114.

The store member 110 is a regular member who receives a client shopping mall, and the agent member 112 is a regular member who has assigned one or more client shopping malls to others. The level-agent member 114 is a regular member who satisfies prerequisites such as a predetermined number of assigned shopping malls or predetermined business/sales record.

A plurality of level-agents (or level-agent stores) may exist according to the number of sale-in-lots shopping malls or the grade of business record, for example, a level-1 agent-store, a level-2 agent-store, . . . , a level-N agent-store. Also, information of a recommender, who recommends the shopping mall to an applicant, may also be registered in the retail shopping mall regular-member storage unit 102.

To become a wholesale shopping mall-qualified member stored in the wholesale shopping mall-qualified member storage unit 104, the member should be a retail shopping mall regular member and a taxable enterprise that has a general business registration certificate.

The wholesale shopping mall-qualified member is divided into a free-of-charge wholesale shopping mall-qualified member and a pay-for-use wholesale shopping mall-qualified member.

The pay-for-use wholesale shopping mall-qualified member can receive desired commodities at prices lower than those of the free-of-charge wholesale shopping mall-qualified member.

The wholesale shopping mall-qualified member may receive an additional wholesale shopping mall different from the retail client shopping mall.

However, the wholesale shopping mall-qualified member has no authority to assign the wholesale shopping mall to others, differently from the retail shopping mall regular member. In other words, the wholesale shopping mall-qualified member is not allowed to sell the wholesale shopping malls.

An enterprise member (i.e., B2B member) stored in the enterprise-member storage unit 106 is indicative of a product provider affiliated (i.e., an affiliated product-provider) with the main server. For example, the affiliated product-provider may be a manufacturing enterprise, a distribution enterprise, a SOHO distribution enterprise, or a SOHO trade enterprise (e.g., an importer trader). Upon receipt of a registration request of the B2B/B2C affiliated-store enterprise member, information of enterprise members approved by the head office is registered in the enterprise-member storage unit 106.

The enterprise member stored in the enterprise-member storage unit 106 is classified into a general-enterprise member 130 and an affiliated-store enterprise member 132, and the members 130 and 132 can provide the shopping mall with a variety of commodities. The general-enterprise member 130 is indicative of member(s) of either general companies or associations that desire to enter their commodities in the online integrated shopping mall. The affiliated-store enterprise member 132 is indicative of member(s) of either manufacturing- and distribution-companies or associations that have a sales team composed of at least 1000 salespersons.

The affiliated-store enterprise member 132 may include not only the manufacturing company but also home-selling company and multi-level marketing company.

Referring back to FIG. 1, a detailed description of the commodity DB 28b managed by the DB server 26 is as follows.

The commodity DB 28b stores commodity information of a variety of commodities, for example, a commodity image, a commodity price, and a product explanation, etc.

Figure 3:
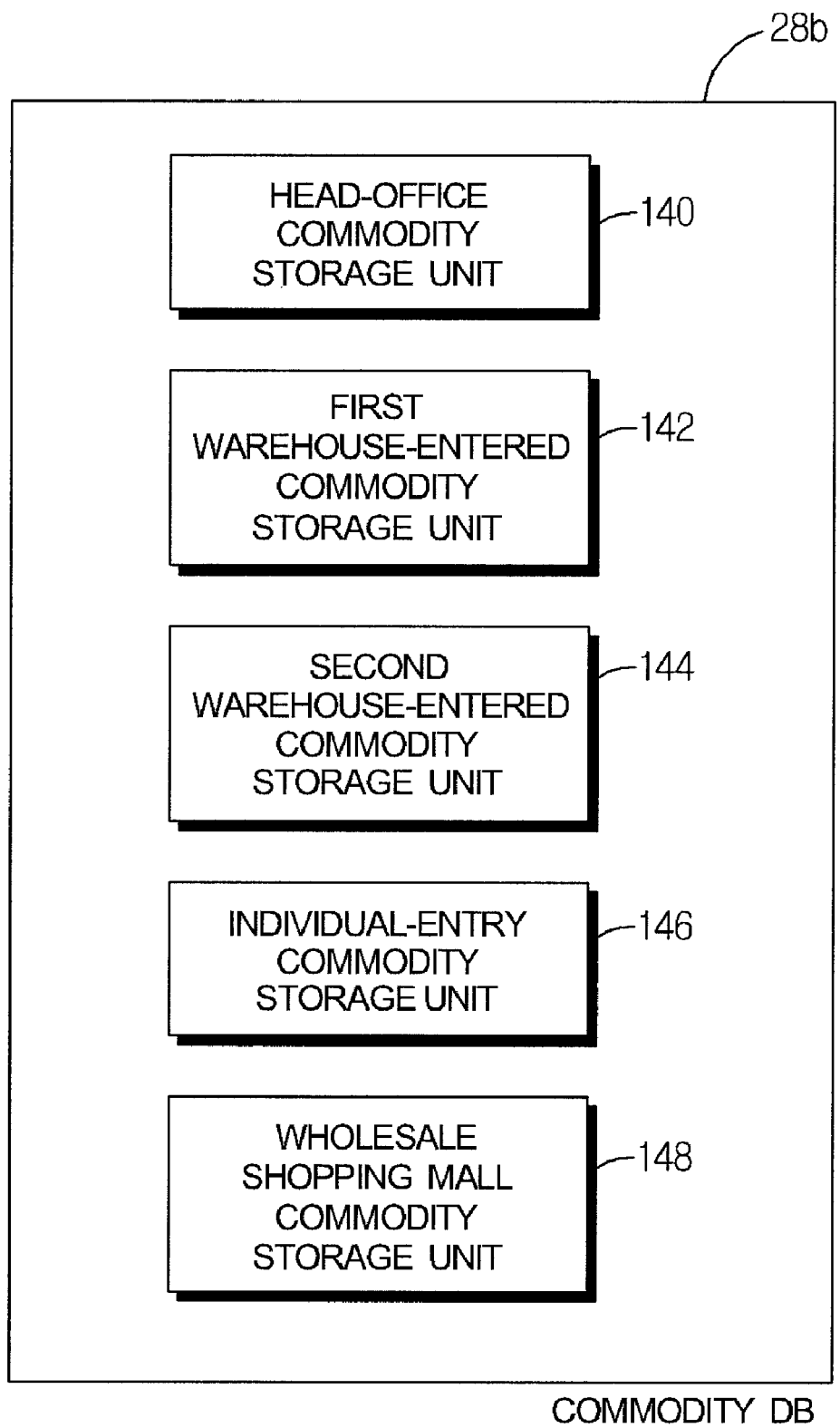
FIG. 3 is a detailed block diagram illustrating a commodity database (DB) shown in FIG. 1 according to the present invention.

FIG. 3 is a detailed block diagram illustrating the commodity database (DB) 28b shown in FIG. 1 according to the present invention.

Referring to FIG. 3, the commodity DB 28b includes a head-office commodity storage unit 140, a first warehouse-entered commodity storage unit 142, a second warehouse-entered commodity storage unit 144, an individual-entry commodity storage unit 146, and a wholesale shopping-mall commodity storage unit 148. A variety of commodity information is stored in the above-mentioned storage units while being classified according to categories.

The head-office commodity storage unit 140 stores information of commodities directly supplied from the system-provision head office or information of contract-deposited commodities supplied from the system provision head office. The above-mentioned commodity information is stored as commodities of the head office. The head-office commodity information is stored in the head-office commodity storage unit 140 of the commodity DB 28b via the I/O unit 22 by the system main administrator.

The first and second warehouse-entered commodity storage units 142 and 144 store information of commodities deposited in a distribution warehouse of the head office.

The information of commodities of the first warehouse-entered commodity storage unit 142 relates to commodities which are entrusted to the offline distribution warehouse of the system provision head-office, and are image-processed by the system main administrator, and are simultaneously displayed on all the client shopping malls.

The information of commodities of the second warehouse-entered commodity storage unit 144 relates to other commodities. In this case, the second warehouse-entered commodity information is directly image-processed by the administrator of the client shopping mall, such that the corresponding commodities are simultaneously displayed all over the client shopping malls.

Individual-entry commodity information stored in the individual-entry commodity storage unit 146 relates to specific commodities that are directly image-processed by the administrator who has received (or purchased) the client shopping mall, such that the specific commodities are displayed on only the administrator's client shopping mall.

Wholesale shopping mall commodity information stored in the wholesale shopping mall commodity storage unit 148 relates to specific commodities displayed on the wholesale shopping mall.

Figure 4:
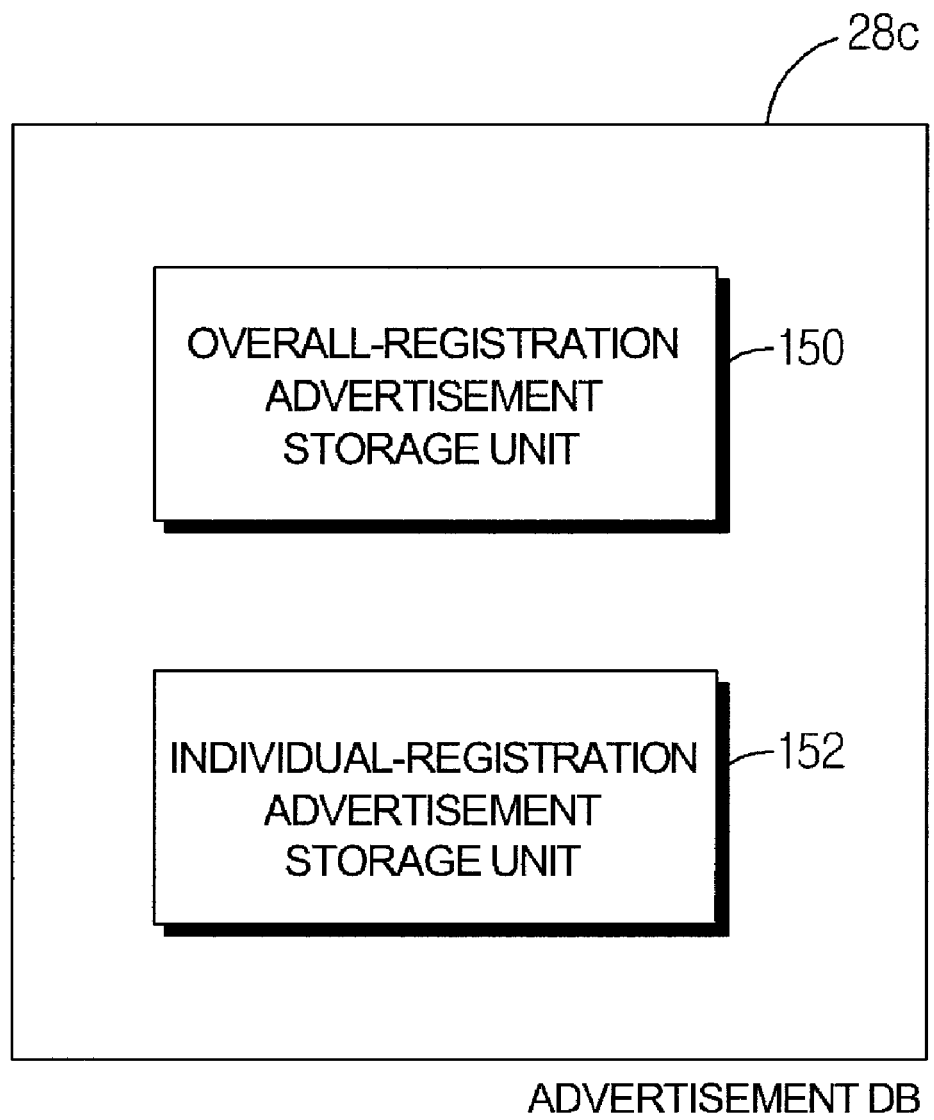
FIG. 4 is a detailed block diagram illustrating an advertisement database (DB) shown in FIG. 1 according to the present invention.

Referring back to FIG. 1, the advertisement DB 28c managed by the DB server 26 includes an overall-registration advertisement storage unit 150 and an individual-registration advertisement storage unit 152, as shown in FIG. 4.

FIG. 4 is a detailed block diagram illustrating the advertisement DB 28c shown in FIG. 1 according to the present invention.

Referring to FIG. 4, the overall-registration advertisement storage unit 150 includes a main-page of the integrated shopping mall and advertisement information registered in client-pages of all the client shopping malls.

The individual-registration advertisement storage unit 152 stores advertisement information registered in only the client shopping mall of each user.

The advertisement information stored in the overall-registration and individual-registration advertisement storage units 150 and 152 includes member information, company information, and commodity information of the shopping-mall administrator, and further includes advertisement-banner information, business-card information or handout request information. If the main administrator or client administrator registers desired advertisement information via the banner-advertisement recommender manager 34, the above-mentioned advertisement information may be entered by the main administrator or the client administrator.

The initial-visitor recording DB 28d stores information of visitors who have initially visited the wholesale shopping mall or the retail shopping mall (i.e., a retail client shopping mall) via the Internet banner advertisement messages.

Figure 5:
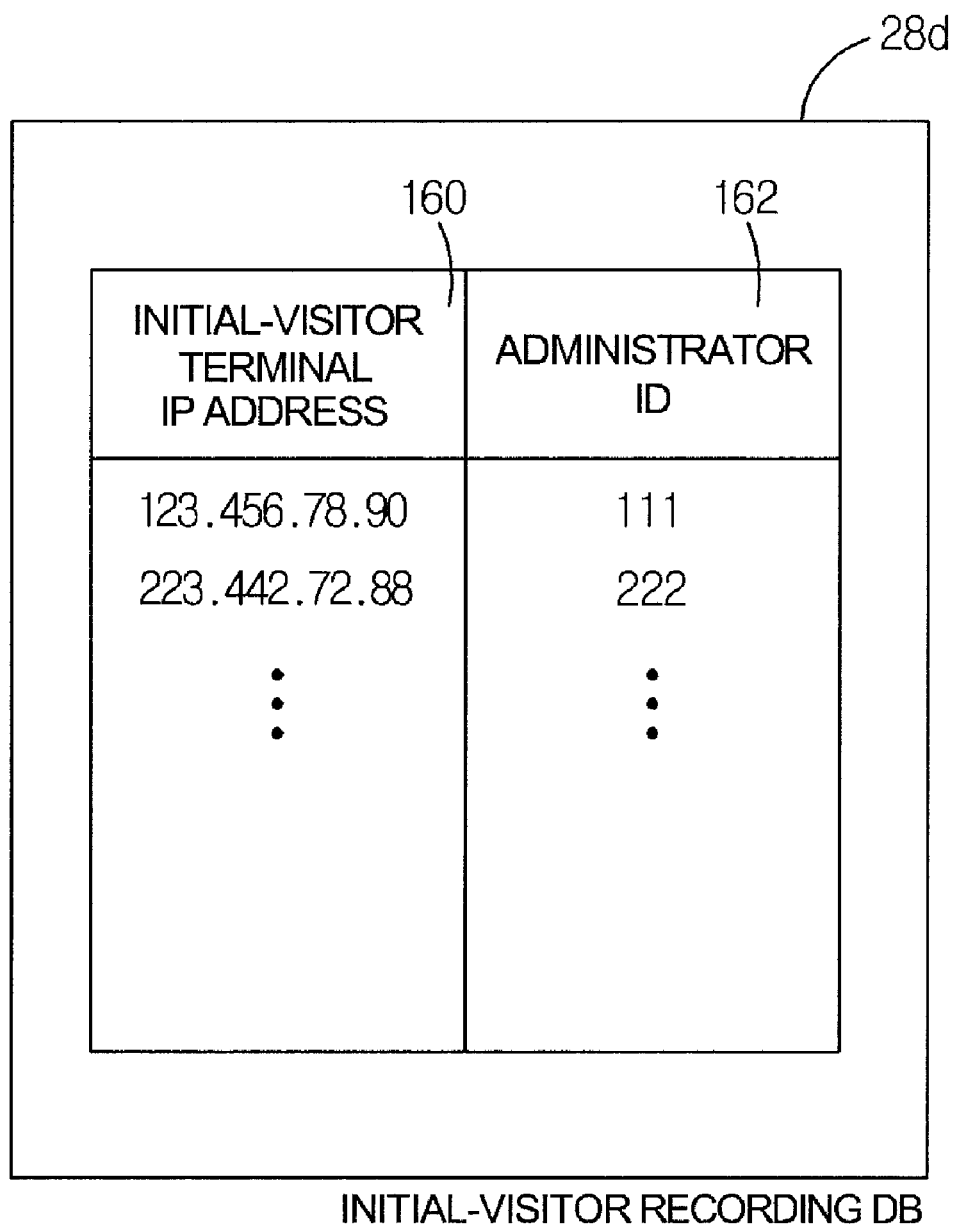
FIG. 5 is a detailed block diagram illustrating an initial-visitor recording database (DB) shown in FIG. 1 according to the present invention.

FIG. 5 is a detailed block diagram illustrating the initial-visitor recording database (DB) 28d shown in FIG. 1 according to the present invention. Referring to FIG. 5, an IP address 160 of the computer terminal of the visitor who has initially visited the client shopping mall is matched with an ID 162 of the administrator of the client shopping mall, such that the matched result is configured in the form of a table, and is then stored in the initial-visitor recording DB 28d.

The information-registration DB 28e of FIG. 1 includes a variety of information of the integrated shopping mall, for example, information associated with a main-page of each shopping-mall administrator, client-administrator's information, client-administrator's order-selling management information, client-administrator's commodity-registration management information, client shopping-mall design management information, client-administrator's member management information, client server bulletin management information, client-administrator's bulletin additional-creation management information, client-administrator's access-statistics management information, client-administrator's main-domain forwarding service information, information associated with a client advertisement applicant, client-administrator's extension-applicant information, and client direct sale-in-lots settlement management information.

The settlement management DB 28f manages a variety of settlement information of either the client administrator or the wholesale shopping mall administrator. For example, the above-mentioned settlement information includes first profit settlement information caused by the transaction of commodities handled by all the retail shopping malls, second profit settlement information caused by the sales of B2B individual-entry commodities, third profit settlement information caused by the sales of the first and second warehouse-entered commodities, fourth profit settlement information caused by the enterprise member (e.g., a B2B manufacturing company or a distribution company), profits caused by the free-of-charge shopping mall sale-in-lots, and settlement information caused by the sale-in-lots shopping mall marketing advertisement money.

Referring back to FIG. 1, upon receiving a control signal from the main server 20, the commodity-entry and commodity management server 30 registers a variety of commodities as commodity to be sold in the shopping mall using a commodity-entry registration request, manages the sales of the registered commodities, updates commodity information, and manages stocks.

In this case, the commodity-entry process indicates that commodities are classified according to commodity-menu category information, and the commodity information is stored in a corresponding storage unit of the commodity DB 28b via the DB server 26, such that the commodity information including the commodity-explanation and images is displayed on either a main homepage managed by the shopping mall management server 24 or homepages of the client shopping malls, or only the homepage of the corresponding client shopping mall.

There are a variety of commodity-entry registration request methods, i.e., first and second warehouse-entry processing methods and a individual-entry processing method.

According to the first and second warehouse-entry processing methods, if a regular-member administrator or an enterprise-member administrator desires to register desired commodities in the integrated shopping mall, the registered commodities are simultaneously displayed on the integrated shopping mall's main homepage and each homepage of all the shopping malls sold in lots. However, there is a difference between the first warehouse-entry processing method and the second warehouse-entry processing method.

According to the first warehouse-entry processing method, the main administrator of the integrated shopping mall performs image-processing of the registration-requested commodity, and registers the commodity as a formal commodity to be sold.

According to the second warehouse-entry processing method, the regular-member administrator and the enterprise-member administrator perform image-processing on their commodities via an administrator page, and register the commodities as formal commodities to be sold.

According to the individual-entry processing method, if the regular-member administrator desires to register his or her commodities as formal commodities to be sold in the integrated shopping mall, and the regular-member administrator performs image-processing on the corresponding commodities, such that the commodities are displayed on only each homepage of his or her client shopping mall(s).

Figure 6:
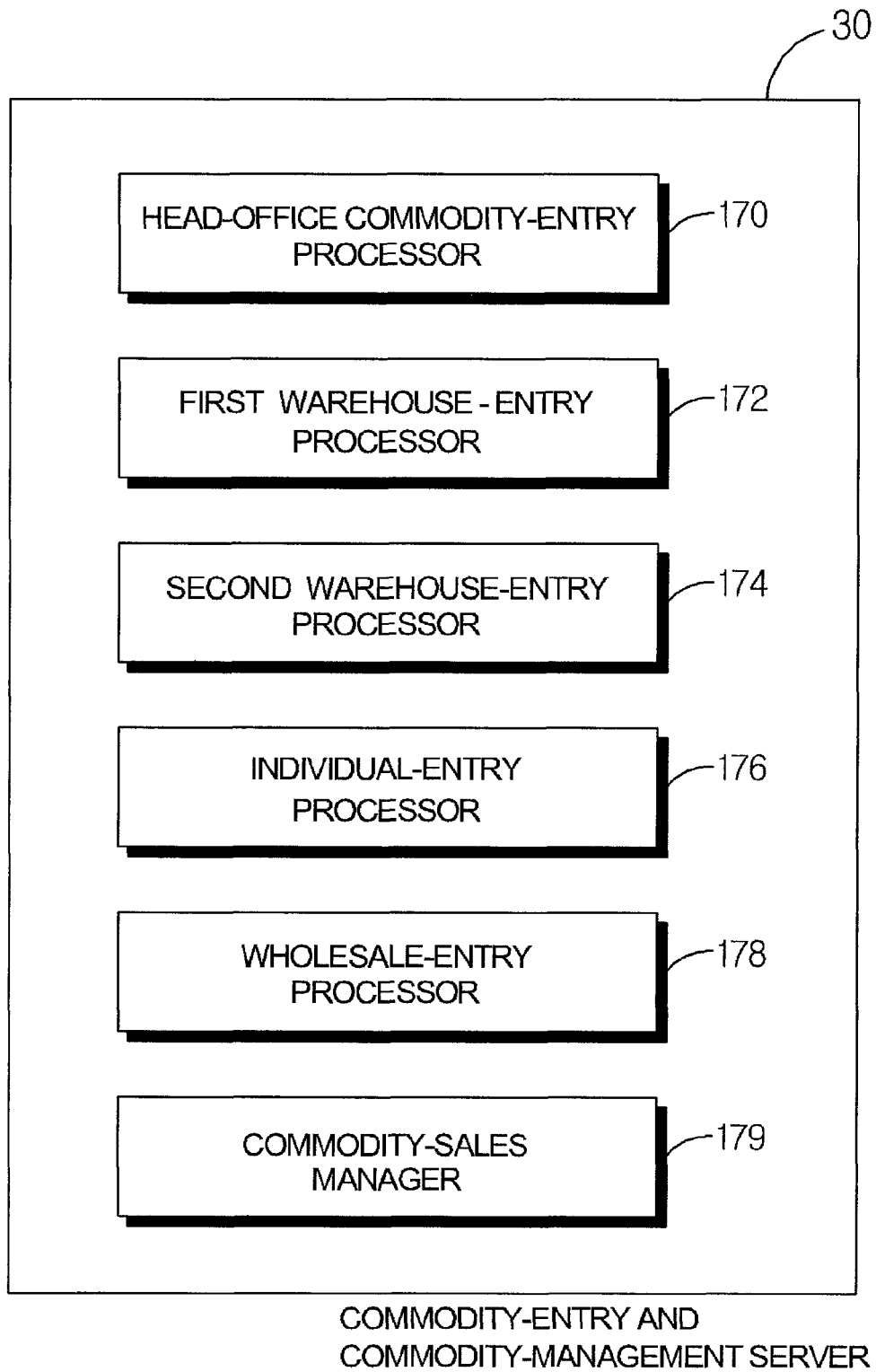
FIG. 6 is a detailed block diagram illustrating a commodity-entry and commodity-management server shown in FIG. 1 according to the present invention.

FIG. 6 is a detailed block diagram illustrating the commodity-entry and commodity-management server 30 shown in FIG. 1 according to the present invention.

Referring to FIG. 6, the commodity-entry and commodity management server 30 includes a head-office commodity-entry processor 170, a first warehouse-entry processor 172, a second warehouse-entry processor 174, an individual-entry processor 176, a wholesale-entry processor 178, and a commodity-sales manager 179.

The head-office commodity-entry processor 170 registers head-office commodities to be stored in the head-office storage unit 140 in the integrated shopping mall. The first warehouse-entry processor 172 registers the first warehouse-entry commodities to be stored in the first warehouse-entered commodity storage unit 142. The second warehouse-entry processor 174 registers the second warehouse-entry commodities to be stored in the second warehouse-entered commodity storage unit 144. The individual-entry processor 176 registers individual-entry commodities to be stored in the individual-entry commodity storage unit 146. The wholesale-entry processor 178 registers commodities to be stored in the wholesale shopping-mall commodity storage unit 148. The commodity-sales manager 179 conducts the sales of commodities, updates commodity information, and manages stocks.

As for the commodities of the first warehouse, if a corresponding administrator (e.g., a regular-member or enterprise-member) desires to register his or her commodities in the first warehouse (i.e., a virtual warehouse) of the integrated shopping mall, the main administrator performs image-processing on the commodities, and arranges the resultant images of the commodities on homepages of all the shopping malls. The price for each commodity stored in the first warehouse is negotiated with the system provision head-office, and then the final price of the commodity is determined. Otherwise, the price for each commodity stored in the first warehouse is determined by the manufacturing- or distribution-company instead of the system provision head-office, and the system provision head-office must only approve the determined price without any operations.

As for the commodities of the second warehouse, the administrator page controlled by the shopping mall management server 24 is provided to allow a corresponding administrator to register the commodities of the second warehouse.

The individual-entry commodities can be displayed on only the Web-site of the administrator. A detailed-description page of the corresponding commodity includes address, name, phone number, after-sales service information, returned good information, etc.

If the shopping mall is determined to be the wholesale shopping mall, the sale-in-lots management unit 32 of FIG. 1 manages only some members who have received the wholesale shopping malls. If the shopping mall is determined to be the retail shopping mall, the sale-in-lots management unit 32 conducts a client shopping mall sale-in-lots, a store-management action, an agent-management action, and a level-agent management action. The sale-in-lots management unit 32 allows only regular members to receive (or purchase) the client shopping mall configured in the form of a retail shopping mall.

Figure 7:
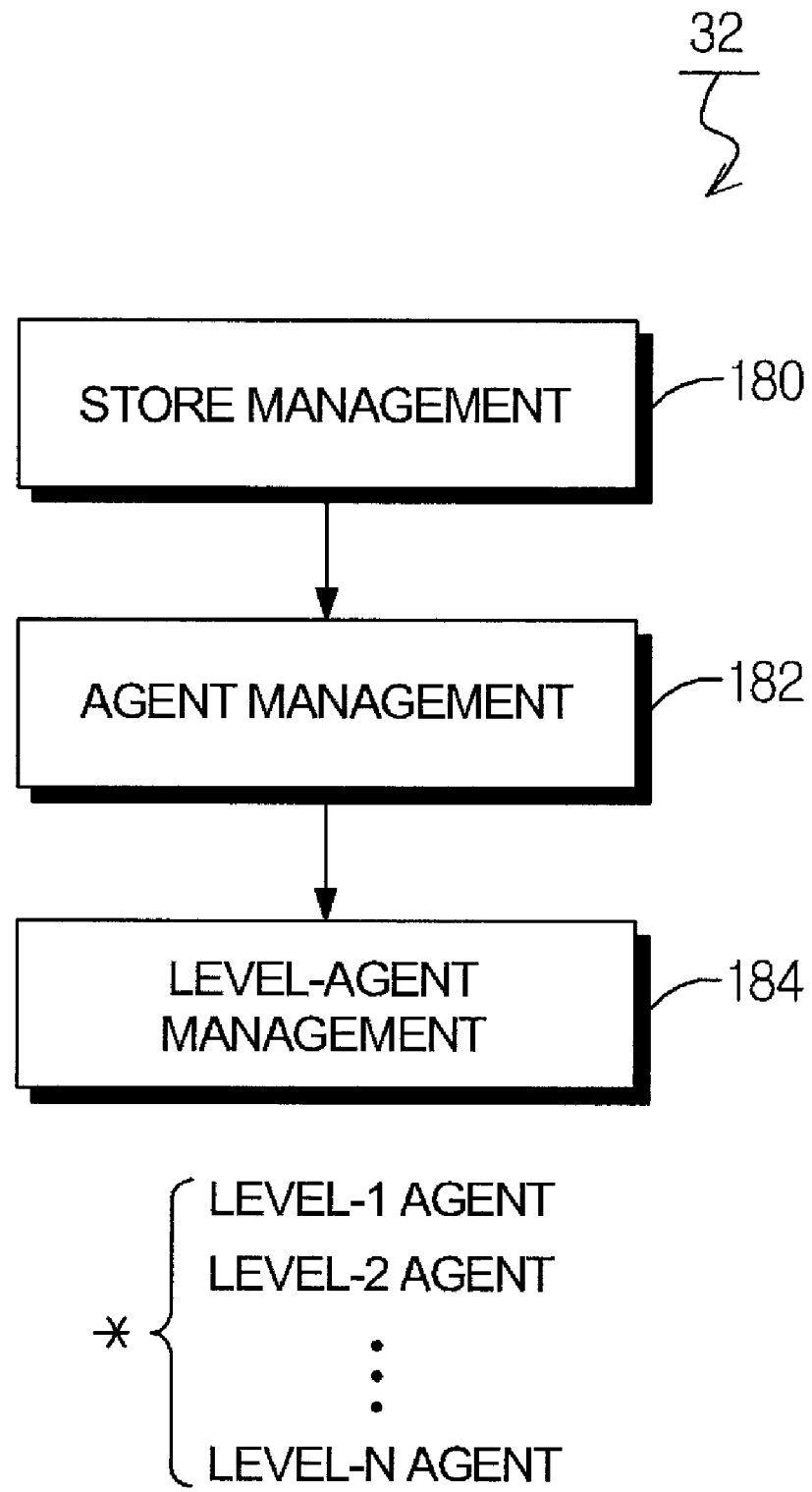
FIG. 7 is a conceptual diagram illustrating a sale-in-lots management unit 32 shown in FIG. 1 according to the present invention.

FIG. 7 is a conceptual diagram illustrating the sale-in-lots management unit 32 shown in FIG. 1 according to the present invention.

Referring to FIG. 7, if the sale-in-lots action of the client shopping mall is conducted by only the regular members, this client shopping mall is managed by the sale-in-lots management unit 32, which is indicated as store management 180 in FIG. 7. If the sale-in-lots action of the client shopping mall is conducted by the shopping mall of the regular member, this regular member acts as a recommender, and is managed as an agent by the sale-in-lots management unit 32, which is indicated as agent management 182 in FIG. 7.

If the regular member associated with the above-mentioned sale-in-lots action satisfies a predetermined number of sold shopping malls or a predetermined grade condition, this regular member is managed as a level-agent by the sale-in-lots management unit 32, which is indicated as level-agent management 184 in FIG. 7.

In the case of managing the level-agents, a plurality of level-agents may be classified according to the number of sale-in-lots shopping malls or the grade of business record, for example, a level-1 agent, a level-2 agent, . . . , a level-N agent.

Referring back to FIG. 1, upon receiving a request from the client shopping mall administrator or the wholesale shopping mall administrator, the banner-advertisement recommender management unit 34 displays the shopping-mall advertisement banner on a single main-page of the integrated shopping mall or a sub-page capable of being extended to several sub-pages.

The banner-advertisement recommender management unit 34 tracks an initial visitor who has access to the shopping mall via the advertisement banner of other portal sites or the advertisement banner of the integrated shopping mall, and tracks client shopping-mall recognition information of the advertisement-banner administrator who has created the advertisement, such that the business record of the advertisement returns to the administrator of the corresponding client shopping mall or the wholesale shopping mall by the banner-advertisement recommender management unit 34.

The banner-advertisement recommender management unit 34 will hereinafter be described in detail.

For the convenience of description and better understanding of the present invention, it is assumed that the number of sale-in-lots client shopping malls is 5, the domain addresses of the sale-in-lots client shopping malls are 111.aaa.co.kr, 222.aaa.co.kr, 333.aaa.co.kr, 444.aaa.co.kr, and 555.aaa.co.kr, respectively. Also, it is assumed that the client shopping mall administrator has displayed the advertisement configured in the form of a banner message on the main page of either the portal site or the integrated shopping mall.

If the "kkk" user has access to the 111.aaa.co.kr by clicking the advertisement banner displayed on the portal site using the computer terminal "A" on a specific day (e.g., January 1), does not register himself or herself as a member in the 111.aaa.co.kr or does not submit a shopping-mall sale-in-lots request to the 111.aaa.co.kr, and finishes the access to the 111.aaa.co.kr, the banner-advertisement recommender management unit 34 analyzes the HTML sources of the client shopping mall main-page.

The banner-advertisement recommender management unit 34 acquires a recognition code (i.e., ID 111) of the client shopping mall administrator from the HTML sources, acquires an IP address of the computer terminal "A" of the "kkk" user from a cookie acting as a temporary file automatically created when the "kkk" has visited the 111.aaa.co.kr client shopping mall homepage, and stores the computer IP address of the initial visitor and the recognition code (ID 111) of the corresponding client shopping mall administrator in the initial-visitor recording DB 28d by the DB server 26, as shown in FIG. 5.

Thereafter, if the "kkk" user who has accessed the 111.aaa.co.kr gains access to the 222.aaa.co.kr client shopping mall using the computer terminal "A" on a specific day (e.g., January 15), registers as a member in the 222.aaa.co.kr, or submits a shopping-mall sale-in-lots request to the 222.aaa.co.kr, the main server 20 searches for the initial-visitor recording DB 28d using the DB server 26, and determines the presence or absence of the recognition code (i.e., ID 111) of the administrator corresponding to the computer A's IP address.

If the initial-visitor recording DB 28d has the above-mentioned administrator's recognition code (ID 111), the main server 20 controls the sale-in-lots management unit 32 to automatically enter the 111.aaa.co.kr administrator in a recommender field of an application form, such that the 111.aaa.co.kr administrator is automatically changed to a recommender. Therefore, the sale-in-lots management unit 32 enables the client shopping mall administrator, who has generated the advertisement during the sale-in-lots application process, to be an agent member of the sale-in-lots applicant "kkk", and completes the sale-in-lots application process.

Therefore, according to the present invention, the business record associated with either a member application or sale-in-lots application of the user who has viewed the corresponding advertisement is given to the client shopping mall administrator who has generated the corresponding advertisement.

Figure 8:
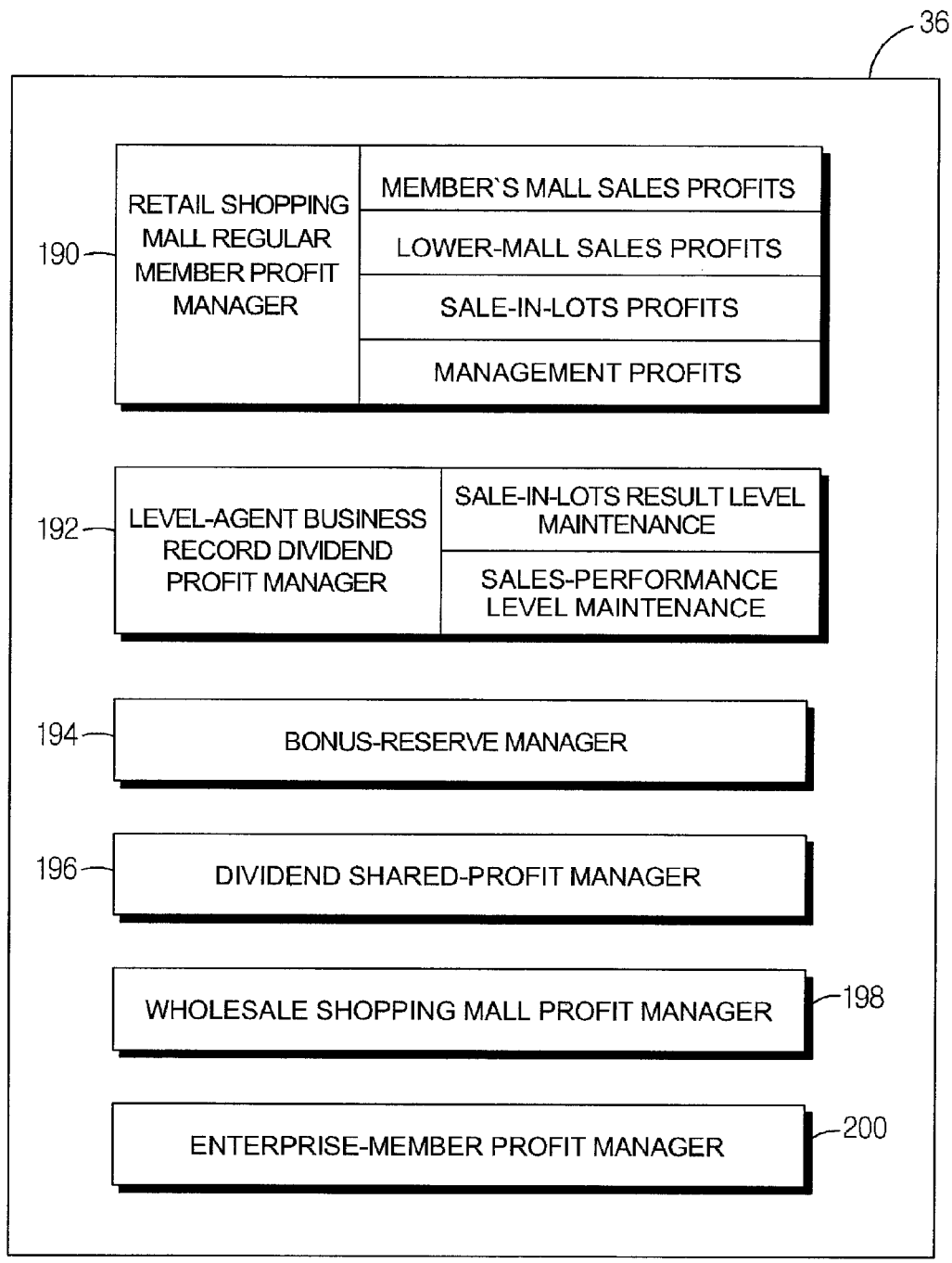
FIG. 8 is a detailed block diagram illustrating a profit management unit shown in FIG. 1 according to the present invention.

FIG. 8 is a detailed block diagram illustrating the profit management unit 36 shown in FIG. 1 according to the present invention.

The profit management unit 36 shown in FIG. 1 will hereinafter be described with reference to FIG. 8.

The profit management unit 36 manages a variety of profits of a retail shopping-mall regular-member, a whole shopping mall-qualified member, and an enterprise member upon receiving a control signal from the main server 20.

Referring to FIG. 8, the profit management unit 36 includes a retail shopping mall regular member profit manager 190, a level-agent business record dividend profit manager 192, a bonus-reserve manager 194, a dividend shared-profit manager 196, a wholesale shopping mall profit manager 198, and an enterprise-member profit manager 200.

The retail shopping mall regular member profit manager 190 of the profit management unit 36 manages a variety of profits caused by the management of the retail client shopping malls. The above-mentioned profits may be classified into sales profits of the client shopping mall of a corresponding member, sales profits of lower malls, sale-in-lots profits, and management profits.

The sales profits of the client shopping mall are created when the administrator of the online integrated shopping mall receives either a predetermined ratio of the sales amount caused by the transaction of the client shopping mall or a predetermined ratio of a margin from the client shopping mall. If necessary, the above-mentioned sales profits of the client shopping mall are managed by the bonus-reserve manager 194.

The sales profits of the lower mall are created when either a predetermined ratio of the sales amount caused by the single lower mall directly sold by the administrator of the online integrated shopping mall or a predetermined ratio of a margin from the lower mall is given back to the administrator.

The sale-in-lots profits are created whenever the lower mall is sold in lots via the banner advertisement or offline advertisement. The management profits are created when the lower mall pays the server maintenance fee every year and a predetermined ratio of the server maintenance fee is paid back.

If the regular member of the client shopping mall acts as a level agent and monthly maintains the level, the level-agent business record dividend profit manager 192 of the profit management unit 36 generates a dividend. The dividend of the level agent is different in level grades (e.g., level-1, . . . , level-N). The monthly level maintenance method is classified into two methods, i.e., a sale-in-lots record level maintenance method and a sales-record level maintenance method.

If the client shopping mall administrator purchases the head-office commodities from his or her shopping mall, the bonus-reserve manager 194 of FIG. 8 manages a predetermined ratio of the costs of the purchased commodities as a cash bonus reserve. If the home-selling company or the multi-level marketing company registers as an enterprise member in the online integrated shopping mall, owners (i.e., enterprises) of the enterprise members receive the client shopping malls from the online integrated shopping mall, the bonus-reserve manager 194 manages the bonus reserve of the corresponding enterprise-members. In this case, the above-mentioned bonus reserve can be adaptively determined to be suitable for the enterprise-member request.

The bonus-reserve management process can be visually recognized on the main homepage of the online integrated shopping mall or the homepage of the client shopping mall. Menu buttons denoted by "epv" of the main homepage of FIG. 9 are indicative of the buttons associated with the bonus reserve service.

The above-mentioned bonus reserve is e-money, and is settled every week or every month, such that the settled e-money is given to corresponding members. The head office of the online integrated shopping mall may give specific bonus-cards to the members to accumulate the reserves.

The reserve-card number of the bonus-reserve card is created and issued by the bonus-reserve manager 194.

In more detail, if the agent-member of the client shopping mall submits a request for issuing the bonus-reserve card, the bonus-reserve manager 194 assigns a member authentication code (i.e., ID) and a card number to the corresponding agent-member, such that the card number is created and issued.

The issued bonus-reserve card number is manufactured as an actual card by the head office, and is delivered to the agent-member of the client shopping mall via a delivery service. Using the bonus-reserve card number of the bonus-reserve card, the agent-member of the client shopping mall can make payment for the purchased commodity in the bonus-reserve card.

The dividend shared-profit manager 196 of FIG. 8 sums up the following profits caused by the management of the online integrated shopping mall, determines the sum of the profits to be shared profits, and distributes the shared profits to the integrated shopping mall head-office, the enterprise-member, and the level-agent, etc.

There are a variety of shared profits, for example, a selling commission acquired from the client shopping mall, a selling commission acquired from B2B/B2C affiliated-store enterprise-member, advertisement profits, import-export intermediary service profits, and wholesale shopping mall sale-in-lots profits, etc.

The wholesale shopping mall profit manager 198 manages profits of the wholesale shopping mall, and has a unique profit structure different from that of the retail shopping mall. The wholesale shopping mall profit structure and the wholesale shopping mall management method are determined to be suitable for individual companies providing commodities. The enterprise-member profit manager 200 manages profits of the enterprise member. In more detail, the enterprise-member profit manager 200 manages some parts of the above-mentioned shared-profits, some parts of sale-in-lots profits of the client shopping malls after the enterprise-member organization is set up, and some parts of total sales-amount of the client shopping malls.

Referring back to FIG. 1, the member-qualification management unit 38 manages a member-qualification of the integrated shopping mall upon receiving a control signal from the main server 20. Particularly, the member-qualification manager 38 monthly manages a level-agent grade status of a retail-mall regular-member, and manages the level grade status on the basis of the sale-in-lots record and sales record of the corresponding regular member.

The settlement server 40 is connected to an external settlement service unit 42, for example, a credit-card company server, a bank server, a mobile communication company server, and electronic-money server, etc. Upon receiving a control signal from the main server 20, the settlement server 40 concentrates all the settlement transactions of the wholesale shopping malls and retail shopping malls (i.e., client shopping malls) on one place, and conducts the concentrated transactions at the place. If the commodity selling transaction is conducted in each client shopping mall, the settlement of the commodity is transferred to the account of the system provision head-office, such that it prevents unnecessary costs required for constructing a unique settlement system of each shopping mall from being generated, and prevents inefficient doubled-investment from being generated.

The settlement server 40 may use a variety of settlement methods, for example, a credit card (electronic settlement), deposit without passbook, a bonus-reserve card, mileages, electronic money, mobile-phone payment, and other electronic settlement methods.

FIG. 9 is an exemplary main-page of the online integrated shopping mall according to a preferred embodiment of the present invention.

Referring to FIG. 9, the main page of the online integrated shopping mall includes a button for enterprise-regular-member registration, a button for enterprise affiliated-store member registration, a button for shopping-mall member registration, and a button for general-member registration. In addition, the main page shown in FIG. 9 further includes a menu-button indicating the wholesale shopping mall sale-in-lots, a my-page menu-button, a menu button for indicating affiliation information, and a menu button for indicating the sale-in-lots of the free-of-charge shopping, etc. Also, the main page of FIG. 9 further includes a B2B/B2C category button, a group-buying button, a commodity-entry-information button, and a commodity-registration button, etc.

The user can register himself or herself as a member in the main server by clicking the member-registration menu button, such that the user can be registered in the main server in various ways. The user may register his or her commodities as formal commodities in the main server. If the user is qualified, the user may receive the wholesale shopping mall from the main server.

If the user clicks the above-mentioned my-page menu button of the main page of the online integrated shopping mall shown in FIG. 9, and the user is determined to be the B2B/B2C affiliated-store enterprise-member, an independent administrator page given to the enterprise-member is displayed.

The B2B/B2C affiliated-store enterprise member may update, correct, or delete commodity information in an administrator mode of an independent administrator page managed by the enterprise-member administrator. All the commodity information registered-, corrected- and deleted-by the enterprise-member administrator are simultaneously applied to all the client shopping malls. The B2B/B2C affiliated-store enterprise-member who is in the administrator mode can recognize information (i.e., total sales amount) of all the commodities sold by the client- or wholesale-shopping mall at first sight.

If the B2B/B2C affiliated-store enterprise member clicks the mypage menu button of the main page of the integrated shopping mall, and the B2B/B2C affiliated-store enterprise member is determined to be the administrator of the client shopping mall acting as the retail shopping mall, each administrator page is displayed on the computer monitor.

If the client shopping-mall administrator who is in the client shopping-mall administrator page can easily conduct member registration, settlement management, and advertisement sales, etc.

Figure 10:
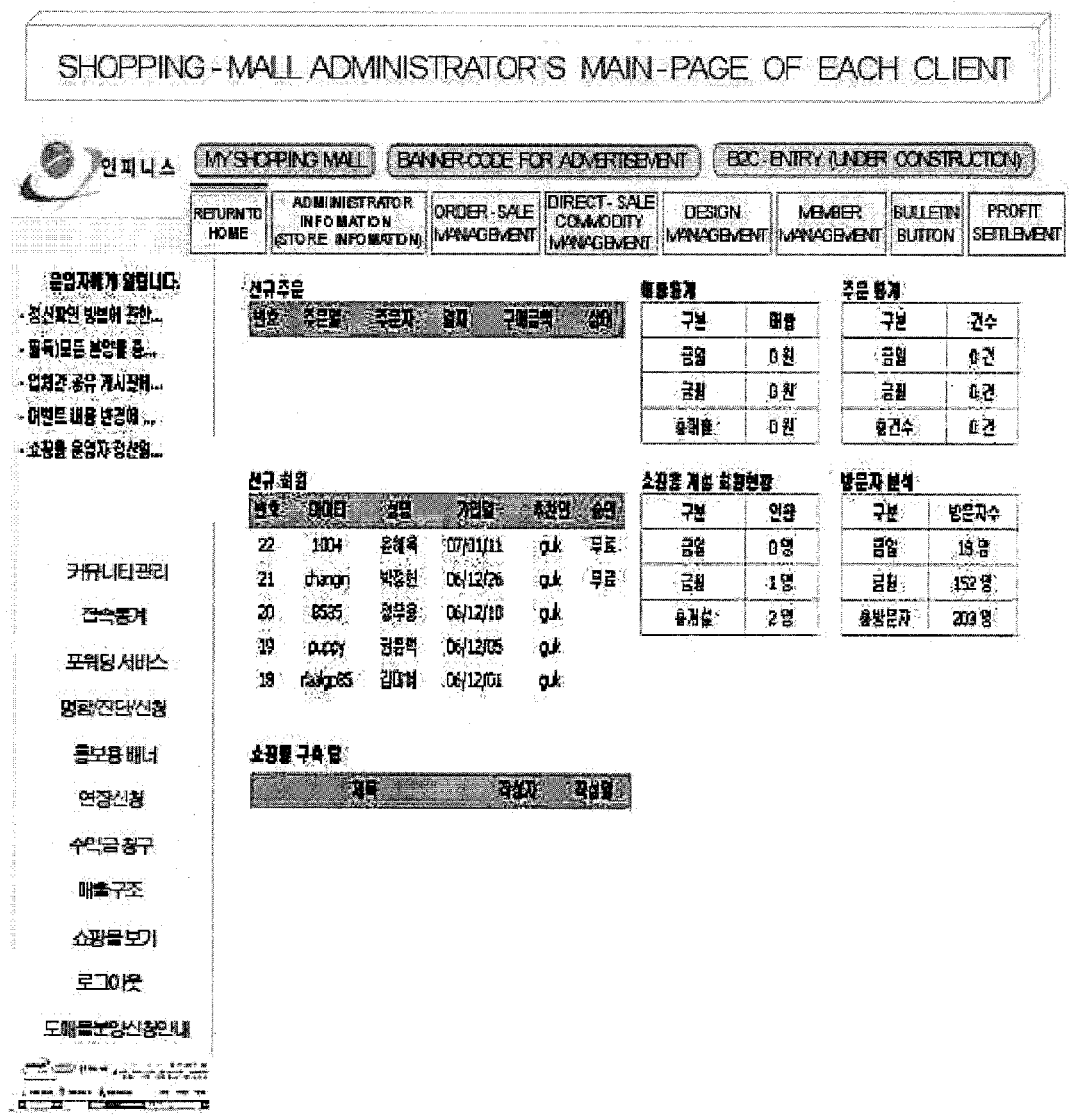
FIG. 10 is an exemplary main screen image of an administrator page of a client shopping mall according to the present invention.

FIG. 10 is an exemplary main screen image of the administrator page of the client shopping mall according to the present invention.

Referring to FIG. 9, the main page of the client shopping-mall administrator page includes an administrator information (i.e., store information) button, an order-sales management button, a direct-sale commodity management button, a design management button, a member management button, a bulletin button, and a profit settlement button, etc.

Therefore, the client shopping-mall administrator may easily go to a desired sub-page by clicking a desired button from among the above-mentioned menu button.

Figure 11:
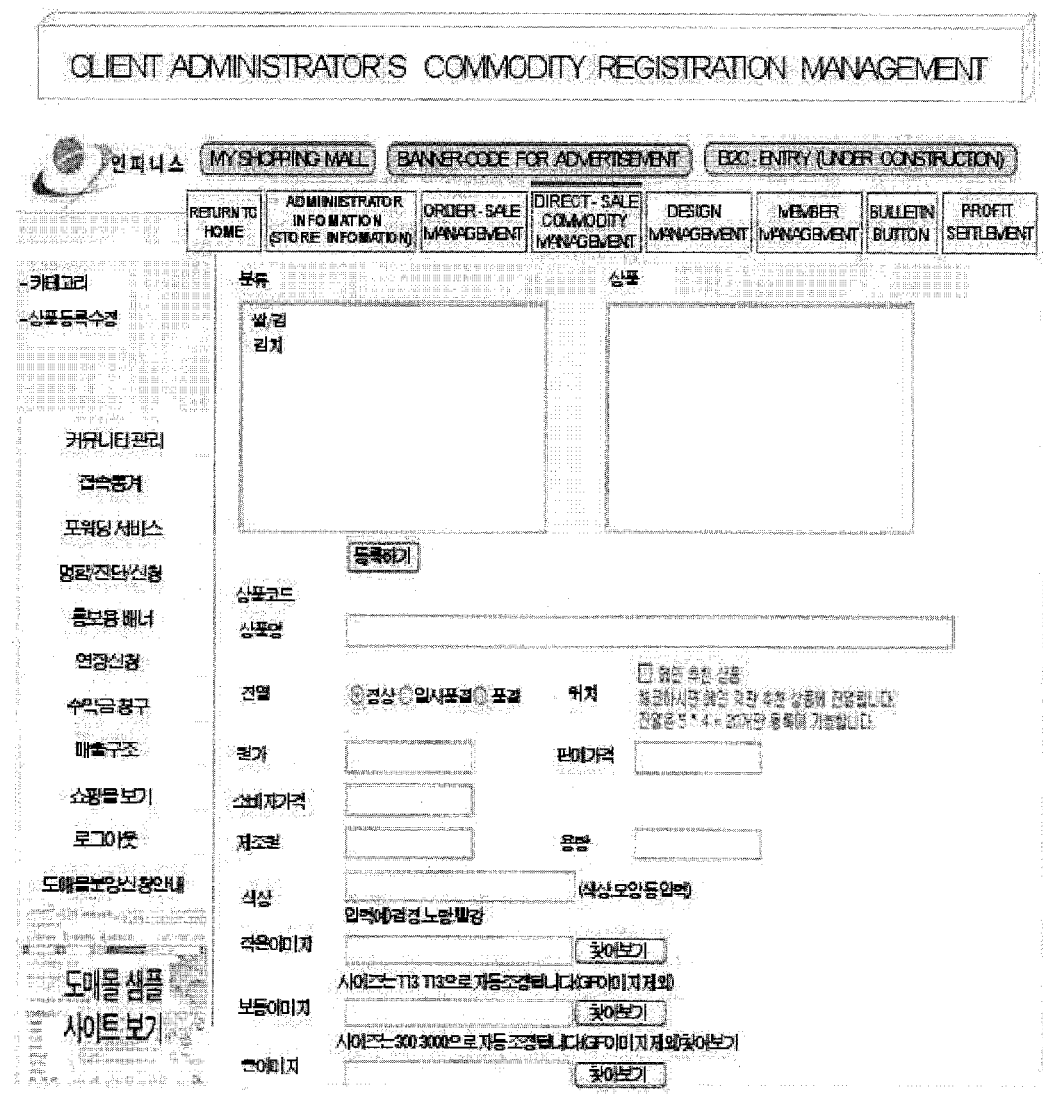
FIG. 11 is an exemplary sub-page displayed by clicking a button corresponding to a direct-sale commodity management function shown in FIG. 10 according to the present invention.

FIG. 11 is an exemplary sub-page displayed by clicking a button corresponding to a direct-sale commodity management function shown in FIG. 10 according to the present invention.

Referring to FIG. 11, the administrator may directly register his or her commodities or directly amend information of the commodities using the direct-sale commodity management sub-page.

Figure 12:
FIG. 12 an exemplary sub-page displayed by clicking a button corresponding to a design management function shown in FIG. 10 according to the present invention.

FIG. 12 an exemplary sub-page displayed by clicking a button corresponding to a design management function shown in FIG. 10 according to the present invention.

Referring to FIG. 12, the administrator may manage the main-page design of the client shopping mall using the design management sub-page, and may register a variety of banners using the same design management sub-page.

Figure 13:
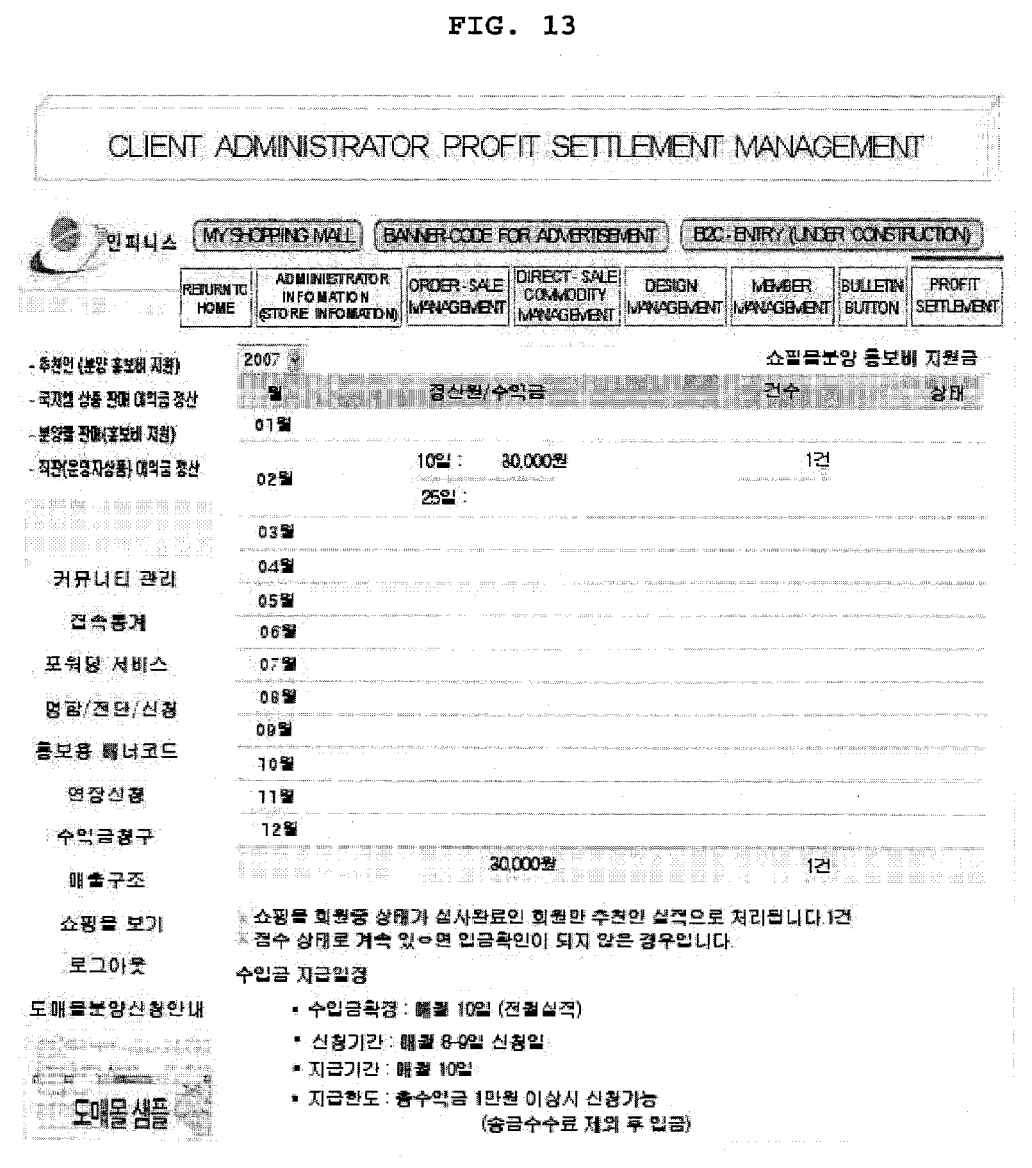

FIG. 13 is an exemplary sub-page displayed by clicking a button corresponding to a profit settlement function shown in FIG. 10 according to the present invention.

If the administrator clicks the profit settlement button of FIG. 10, the sub-page of FIG. 13 is displayed, such that the administrator can easily recognize the profit settlement management information.

Figure 14:
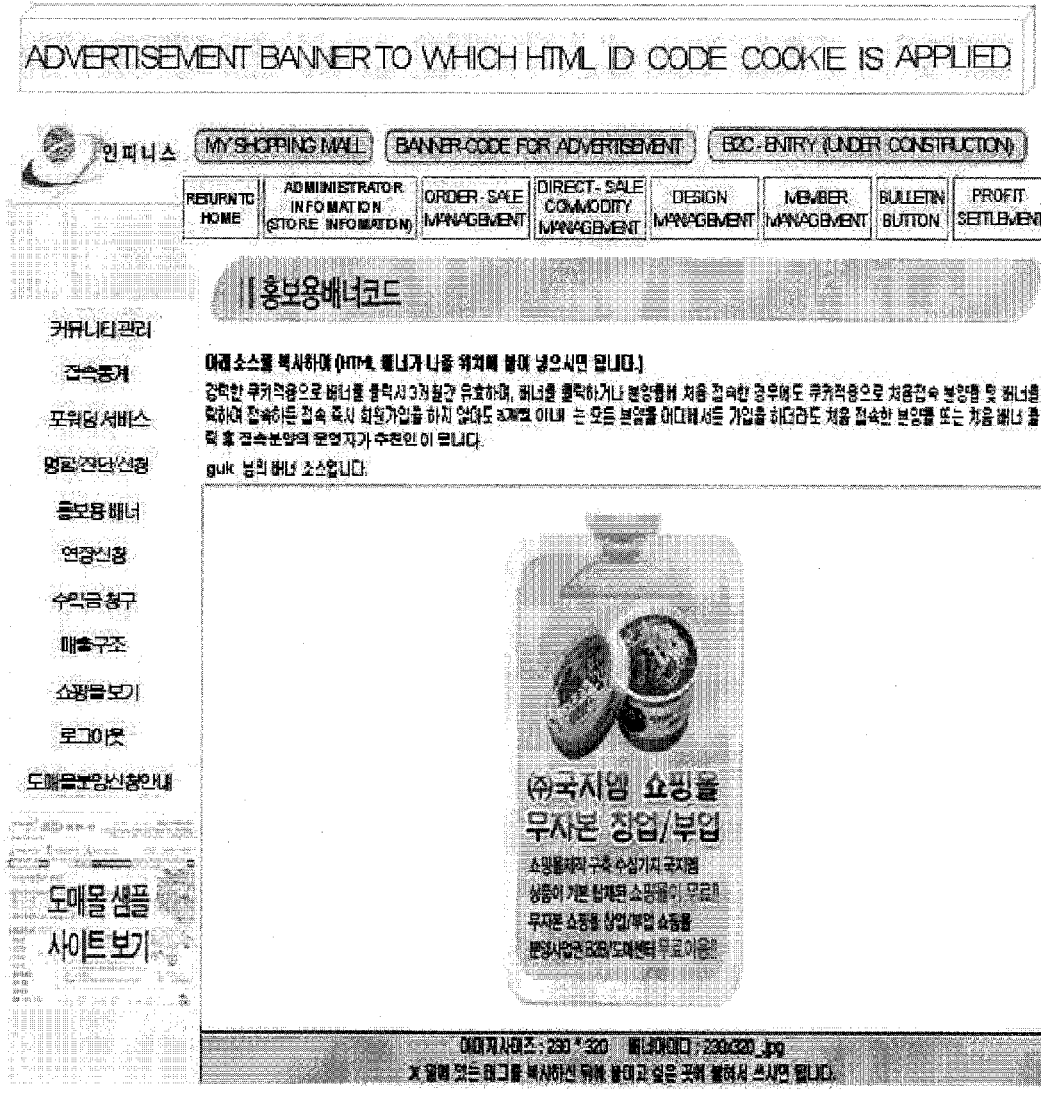
FIG. 14 is an exemplary advertisement-banner page displayed by clicking a button corresponding to a banner code for advertisement on the main screen image of the administrator page shown in FIG. 10 according to the present invention.

FIG. 14 is an exemplary advertisement-banner page displayed by clicking a button corresponding to a banner code for advertisement, from among vertical and horizontal menu buttons displayed on the administrator-page's main page of FIG. 10.

Referring to FIG. 14, the client shopping mall administrator who is in the client shopping mall design management mode may display advertisement-banner HTML source-code information including a variety of advertisement banner images on the advertisement banner code's sub-page. The client shopping mall administrator copies the above-mentioned advertisement-banner HTML source-code information in the advertisement bulletin (e.g., Internet cafes (associations of like-minded persons) of portal sites), and may display the above-mentioned advertisement banner images on the advertisement bulletin.

The HTML sources of the advertisement banner include the ID information of the client shopping mall. Therefore, if the computer user clicks the advertisement banner, he or she may directly go to the client shopping mall of a sub-domain address corresponding to the clicked advertisement banner.

Figure 15:
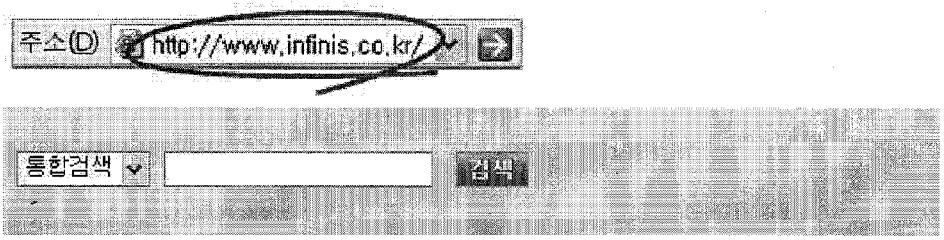
FIGS. 15~17 are exemplary screen images associated with the commodity/information search result according to the present invention.
Figure 15:
Figure 15:
Figure 15:
Figure 16:
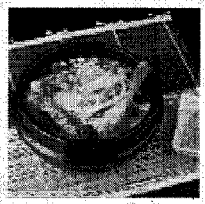
Figure 16:
Figure 17:

FIGS. 15~17 are exemplary screen images associated with the commodity/information search result according to the present invention.

The user of the main homepage shown in FIG. 9 allows the commodity/information search result page of FIG. 15 to be displayed by searching for commodity information via the business-category information. If the user clicks a corresponding commodity in the page of FIG. 15, he or she goes to a details-information page of the corresponding commodity as shown in FIG. 15B. The details-information page of FIG. 15B includes an enterprise-introduction button, a commodity-introduction button, a homepage link button, and buttons for enabling the user to purchase the commodity.

If the user clicks the commodity purchase button in the page of FIG. 16, the purchase page associated with the commodity details-information is displayed as shown in FIG. 17.

Figure 18:
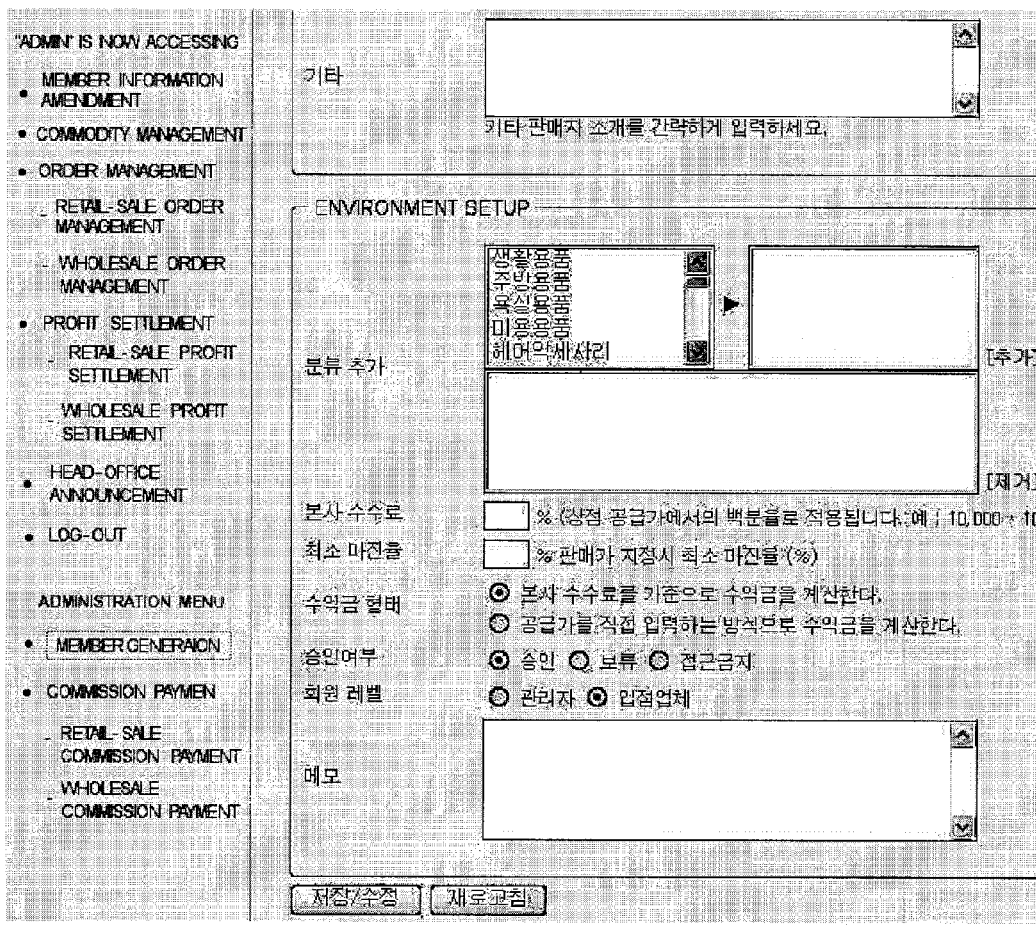
Figure 19:
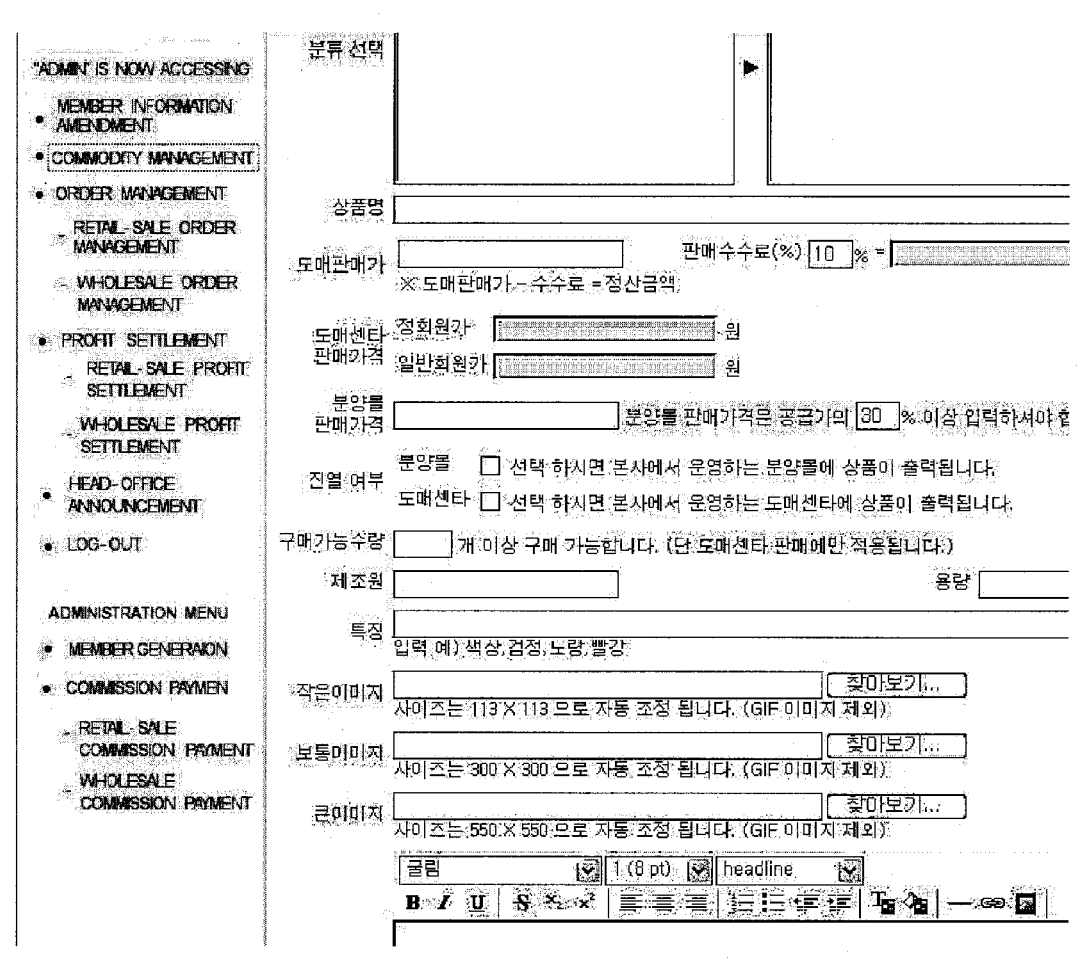

FIGS. 18~19 are exemplary screen images associated with an administrator page of a wholesale shopping mall according to the present invention.

FIG. 18 is an exemplary administrator sub-page for creating members for purchasing commodities from the wholesale shopping mall. FIG. 19 is an exemplary sub-page for managing commodities of the wholesale shopping mall.

FIG. 20 is an exemplary screen image associated with an intermediary trade service according to the present invention.

Referring to FIG. 20, the clients of the import and export companies may register information of commodities as enterprise members. The registered commodity information is configured in the form of advertisement images, and the advertisement images are displayed on all the client- and wholesale-shopping malls sold by the online integrated shopping mall administrator as shown in FIG. 20, such that the sales of commodities can be conducted by the above-mentioned shopping malls. In other words, the Web-page of FIG. 20 includes buttons associated with export/import/order receipt and delivery processes, such that the order receipt and the delivery process of the commodities can be conducted on the main of FIG. 20.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

As apparent from the above description, the online integrated shopping mall service apparatus and method according to the present invention integrates a variety of transactions of the online integrated shopping mall, for example, ensuring of commodities, commodity registration, wholesale- and retail-sales of commodities, and commodity information/advertisement, etc. Therefore, consumer, manufacturers, distribution enterprises, and wholesale/retail enterprises need not visit several places or markets to collect information of necessary commodities, and don't have to employ trade-agents. The integrated shopping mall site according to the present invention is similar to the Web 2.0 concept indicating the user-participation-based Internet environment concept, such that participation, sharing, and opening concepts are emphasized in the integrated shopping mall site.

The present invention can also be applied to the online shopping malls over the Internet.

The invention claimed is:

1. A method for providing an online integrated shopping mall in an integrated shopping mall service apparatus connected to computer terminals over the Internet, comprising:

a) upon receiving a control signal from a shopping mall management server including a product-provider shopping mall manager, a retail shopping mall manager, and a wholesale shopping mall manager, managing a product-provider shopping mall manager by the product-provider shopping mall manager, managing a retail shopping mall by the retail shopping mall manager, managing a wholesale shopping mall by the wholesale shopping mall manager, in which the product-provider shopping mall, the retail shopping mall, and the wholesale shopping mall are managed by a plurality of sub-domains linked to a main domain of the integrated shopping mall;

b) providing an enterprise member with an independent management page via a main homepage of the main domain, such that the enterprise member is able to simultaneously manage commodities supplied to the integrated shopping mall via the main homepage of the main domain;

c) receiving a shopping-mall sale-in-lots request from a general member via the main homepage of the main domain, registering the general member as a regular member, assigning a client shopping mall acting as a retail shopping mall to the regular member free of charge such that the client shopping mall is managed as a sub-domain, and providing the regular member with a homepage of the client shopping mall and a client shopping mall administrator page;

d) assigning a wholesale shopping mall to a wholesale-qualified member selected from regular members as a sub-domain such that the wholesale-qualified member manages the wholesale shopping mall as the sub-domain, and providing the wholesale-qualified member with a homepage and an administrator page of the wholesale shopping mall; and e) if a regular member and an enterprise member requests to register commodities as regular commodities to be sold in the integrated shopping mall, displaying information of the commodities on a main homepage, homepages of client shopping malls, and each client shopping mall's homepage according to a predetermined product-registration request method, and managing the information of the commodities, wherein the method further comprises:

upon receiving the shopping-mall sale-in-lots request from the general member, requesting the general member to enter a specific regular member who has previously received the shopping mall as a recommender;

if the general member enters the regular member as the recommender, assigning a client shopping mall to the general member, and registering the general member who has received the client shopping mall as a regular member; and managing the regular member who has received the client shopping mall as a store member, and managing the regular member registered as the recommender as an agent member.

2. The method according to claim 1, further comprising: selecting regular members whose the number of sale-in-lots shopping malls or the business record satisfies a predetermined rank condition, and managing the selected regular members as a plurality of level-agent members.

3. The method according to claim 1, further comprising:

if a visitor gains access to the client shopping mall via an advertisement banner of a portable site or an advertisement banner of the integrated shopping mall, matching client shopping mall ID information of an administrator of the advertisement banner with a terminal IP address of the visitor, and recording the matched result in a database; and searching for client shopping mall ID information corresponding to the terminal IP address of the computer terminal in the database upon receiving a member registration request from the computer terminal, and entering the client shopping mall ID information in a recommender field of the member registration request.

4. The method according to claim 1, wherein the commodity-registration request step e) includes:

if a regular-member administrator or an enterprise-member administrator requests to register his or her commodities as regular commodities to be sold in the integrated shopping mall, performing image-processing of the requested commodities by a main administrator of the integrated shopping mall, and simultaneously displaying the image-processed commodities on the main homepage of the integrated shopping mall and homepages of all the sale-in-lots shopping malls, thereby performing a first warehouse-entry processing method;

if the regular-member administrator or the enterprise-member administrator directly requests to register his or her commodities as regular commodities to be sold in the integrated shopping mall, performing, by the regular-member administrator or the enterprise-member administrator, image-processing of the requested commodities via an administrator page, and simultaneously displaying the image-processed commodities on the main homepage of the integrated shopping mall and homepages of all the sale-in-lots shopping malls, thereby performing a second warehouse-entry processing method; and if each regular-member administrator requests to register his or her commodities as regular commodities to be sold in the integrated shopping mall, performing, by the regular-member administrator, image-processing of the requested commodities via an administrator page, and displaying the image-processed commodities on homepages of his or her client shopping malls, thereby performing an individual-entry processing method.

5. The method according to claim 1, wherein the administrator page of the client shopping-mall administrator includes at least one of an administrator main-image management page, a direct-sale commodity management page, a design management page; a profit settlement page, and an advertisement banner code.

6. An online integrated shopping mall service apparatus connected to computer terminals over the Internet, in which a B2B (Business-to-Business) transaction, a B2C (Business-to-Consumer) transaction, and a B2B2C (Business-to-Business-to-Consumer) transaction are integrated and conducted at one place, comprising:

a main server for controlling operations of individual components of the online integrated shopping mall service apparatus;

a shopping-mall management server which includes a product-provider shopping mall manager, a retail shopping mall manager, and a wholesale shopping mall manager, receives a control signal from the main server, manages a product-provider shopping mall manager via the product-provider shopping mall manager, manages a retail shopping mall via the retail shopping mall manager, managing a wholesale shopping mall via the wholesale shopping mall manager, in which the product-provider shopping mall, the retail shopping mall, and the wholesale shopping mall are managed by a plurality of sub-domains linked to a main domain of the integrated shopping mall;

a database (DB) unit which includes a member database (DB), a commodity DB, an advertisement DB, an information-registration DB, and a settlement-management DB, and stores a variety of information associated with services of the online integrated shopping mall;

a database (DB) server for managing the individual DBs contained in the DB unit upon receiving a control signal from the main server;

a sale-in-lots management unit for receiving a shopping-mall sale-in-lots request from a general member via a main homepage of the main domain, registering the general member as a regular member in the member DB, and assigning a retail client shopping mall to the regular member free of charge via the retail shopping mall of the shopping mall management server, such that the retail shopping mall is managed as a sub-domain; and a commodity-entry and commodity-management server connected with the commodity DB of the DB unit and the shopping mall management server, wherein if the regular member acting as a retail shopping mall administrator and an enterprise member acting as a product-provider shopping mall manager administrator requests to register commodities as regular commodities to be sold in the integrated shopping mall, the commodity-entry and commodity-management server displays information of the commodities on a main homepage, homepages of retail shopping malls, or each retail shopping mall's homepage according to a predetermined product-registration request method using the commodity DB and the shopping mall management server, and manages the information of the commodities using the commodity DB and the shopping mall management server, wherein the member DB of the DB unit stores information of a store member and an agent member, in which the store member is a regular member who receives a retail shopping mall, and the agent member is a regular member who has assigned one or more retail shopping malls to others.

7. The apparatus according to claim 6, wherein the member DB of the DB unit includes:
   a general-member storage unit for storing information of general members;
   a regular-member storage unit for storing information of regular-members of the retail shopping malls;
   a wholesale shopping mall-qualified member storage unit for storing information of wholesale shopping mall-qualified members; and
   an enterprise-member storage unit for storing information of enterprise-members who provide products or commodities.

8. The apparatus according to claim 7, wherein the regular-member storage unit includes:
   a store-member who receives a free-of-charge client shopping mall, is able to sell commodities, is able to register the commodities in the integrated shopping mall, and is qualified to assign the client shopping mall;
   an agent member who assigns the client shopping mall; and
   a level-agent member who satisfies the number of assigned shopping malls (or sale-in-lots shopping malls) or predetermined business record matched with a predetermined rank condition.

9. The apparatus according to claim 7, wherein the enterprise-member storage unit stores a variety of enterprise members, for example, manufacturing- or distribution-companies, SOHO distribution enterprises, and SOHO trade enterprises (importer traders), in which the enterprise members are classified into general enterprise members indicating general-enterprise or association members who desire to provide the online integrated shopping mall with commodities, and affiliated-enterprise members indicating members of a manufacturing company, distribution company, and association, each of which has a sales team, and the general-enterprise members and the affiliated-enterprise members are stored in different places.

10. The apparatus according to claim 6, wherein the commodity DB of the DB unit includes:
    a head-office commodity storage unit for storing information of commodities directly supplied from a system provision head office or information of contract-deposited commodities supplied from the system provision head office;
    a first warehouse-entered commodity storage unit for storing information of commodities, which are deposited on a warehouse of the system provision head office, are image-processed by a system main-administrator, and are simultaneously displayed on all the client shopping malls as sales commodities;
    a second warehouse-entered commodity storage unit for storing information of commodities, which are directly image-processed by a client administrator, and are simultaneously displayed on all the client shopping malls;
    an individual-entry commodity storage unit for storing information of commodities, which are directly image-processed by an administrator who has received the client shopping mall, and are displayed on only the administrator's client shopping mall as sales commodities; and
    a wholesale shopping-mall commodity storage unit for storing information of wholesale-mall commodities displayed on the wholesale shopping mall.

11. The apparatus according to claim 10, wherein the commodity-entry and commodity-management server includes:
    a head-office commodity-entry processor for registering head-office commodities to be stored in the head-office storage unit;
    a first warehouse-entry processor for registering first warehouse-entry commodities to be stored in the first warehouse-entered commodity storage unit;
    a second warehouse-entry processor for registering second warehouse-entry commodities to be stored in the second warehouse-entered commodity storage unit;
    an individual-entry processor for registering individual-entry commodities to be stored in the individual-entry commodity storage unit;
    a wholesale-entry processor for registering commodities to be stored in the wholesale shopping-mall commodity storage unit; and
    a commodity-sales manager for conducting the sales of commodities, updating commodity information, and managing stocks.

12. The apparatus according to claim 6, wherein the DB unit further includes:
    an initial-visitor recording DB which matches a terminal IP address of an initial visitor, who gains access to the client shopping mall via an advertisement banner, client shopping mall ID information of an administrator of an advertisement banner, and stores the matched result.

13. The apparatus according to claim 12, further comprising:
    a banner-advertisement recommender management unit, if a user gains access to the homepage via his or her computer terminal and requests to register himself or herself as a member, which searches for client shopping mall ID information corresponding to an IP address of the computer terminal in the initial-visitor recording DB, and entering the client shopping mall ID information in a recommender field of a member registration request if the client shopping mall ID information is detected from the initial-visitor recording DB.

* * * * *